(12) United States Patent
Liu

(10) Patent No.: US 11,086,293 B2
(45) Date of Patent: Aug. 10, 2021

(54) MACHINING PROGRAM GENERATION SUPPORT DEVICE

(71) Applicant: FANUC CORPORATION, Yamanashi (JP)

(72) Inventor: Zhaojia Liu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/934,225

(22) Filed: Jul. 21, 2020

(65) Prior Publication Data
US 2021/0041851 A1   Feb. 11, 2021

(30) Foreign Application Priority Data
Aug. 9, 2019   (JP) .............................. JP2019-147575

(51) Int. Cl.
*G05B 19/4093* (2006.01)
*G05B 19/4069* (2006.01)
*G05B 19/4097* (2006.01)

(52) U.S. Cl.
CPC ..... *G05B 19/4097* (2013.01); *G05B 19/4069* (2013.01); *G05B 19/40932* (2013.01)

(58) Field of Classification Search
None
See application file for complete search history.

(56) References Cited

U.S. PATENT DOCUMENTS

| 5,581,676 A * | 12/1996 | Ueno | G05B 19/40937 345/440 |
| 7,069,175 B2 * | 6/2006 | Sakurada | G05B 19/4069 702/167 |
| 2016/0011584 A1 * | 1/2016 | Matsubara | G05B 19/40931 700/160 |
| 2016/0077518 A1 * | 3/2016 | Matsubara | G05B 19/4099 700/159 |
| 2018/0120813 A1 * | 5/2018 | Coffman | G06F 30/00 |
| 2019/0339676 A1 * | 11/2019 | Wakairo | G05B 19/40937 |

FOREIGN PATENT DOCUMENTS

JP         H11066112 A    3/1999

* cited by examiner

*Primary Examiner* — Ryan A Jarrett
(74) *Attorney, Agent, or Firm* — Studebaker & Brackett PC

(57) ABSTRACT

A machining program generation support device includes: a CAD data analysis unit which analyzes the CAD data so as to obtain CAD shape information; a machining program analysis unit which. analyzes the machining program in the middle of being produced so as to obtain machining shape information in the middle of being produced; a shape matching unit which performs matching of shapes of the CAD shape information and the machining shape information in the middle of being produced so as to obtain. matching shape information; and a candidate shape program generation unit that predicts, based on the CAD shape information, a candidate shape following the matching shape information, and that thereby predicts a candidate shape following the machining shape information in the middle of being produced so as to automatically generate a machining program for the candidate shape following the machining program in the middle of being produced.

5 Claims, 23 Drawing Sheets

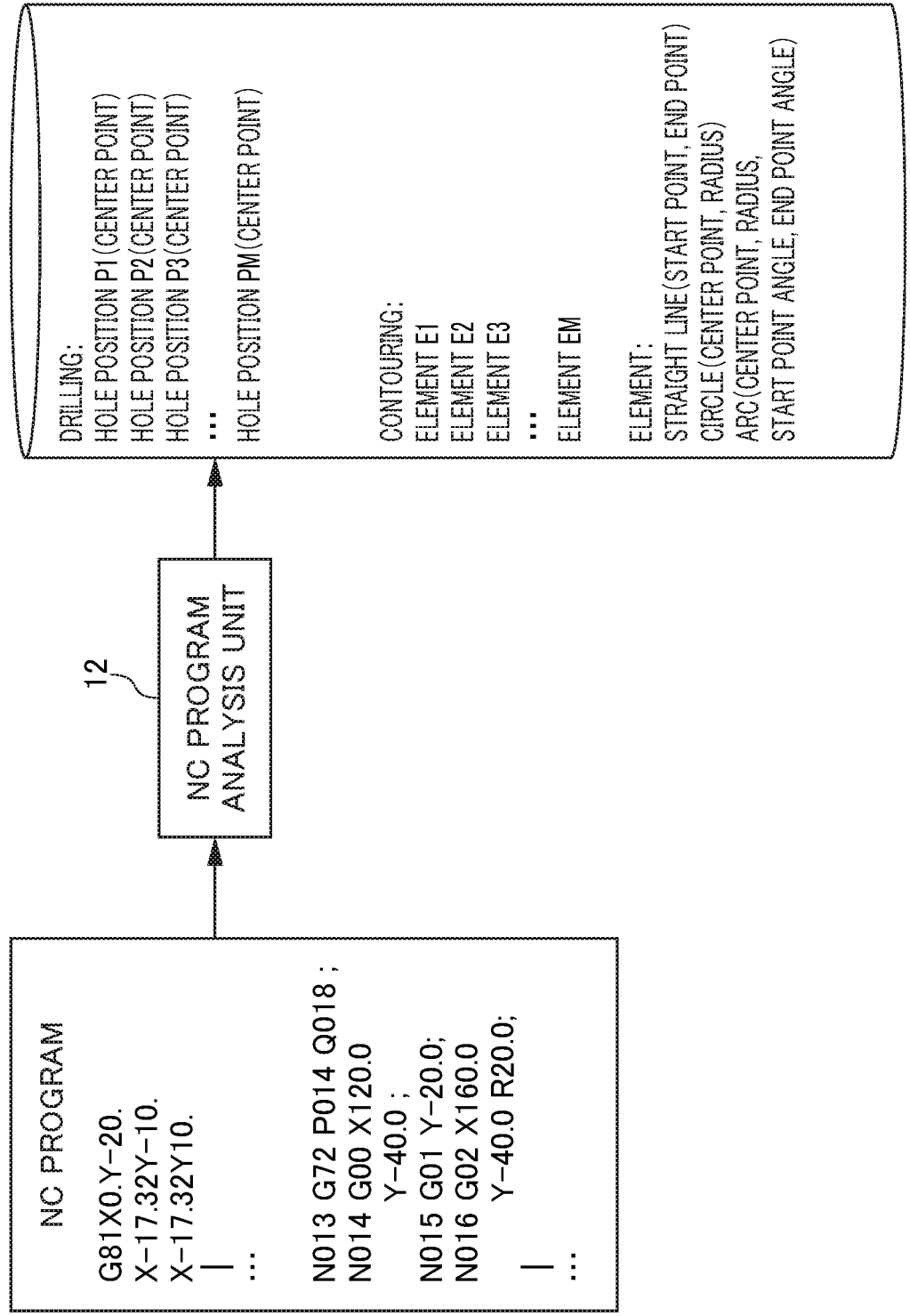

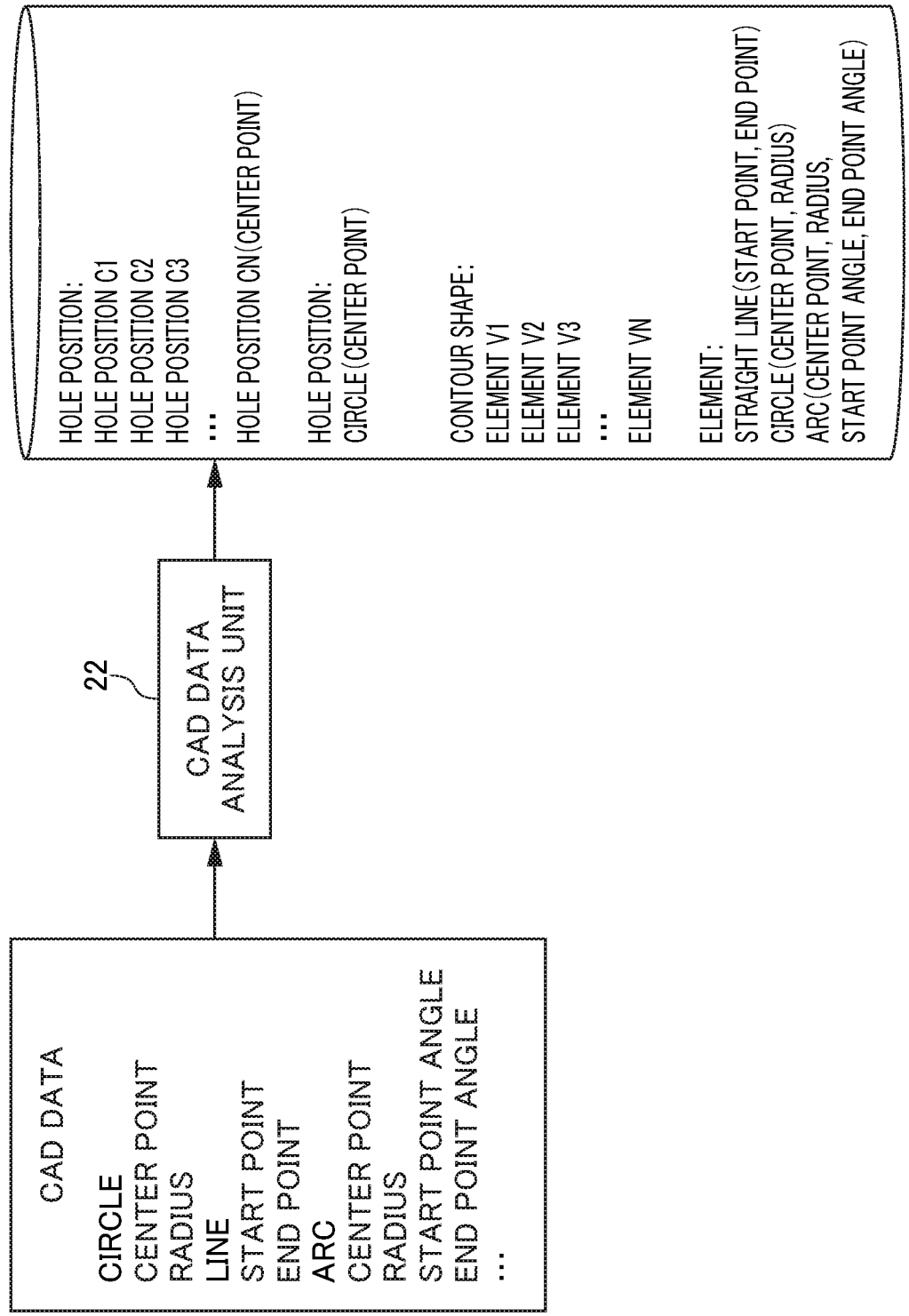

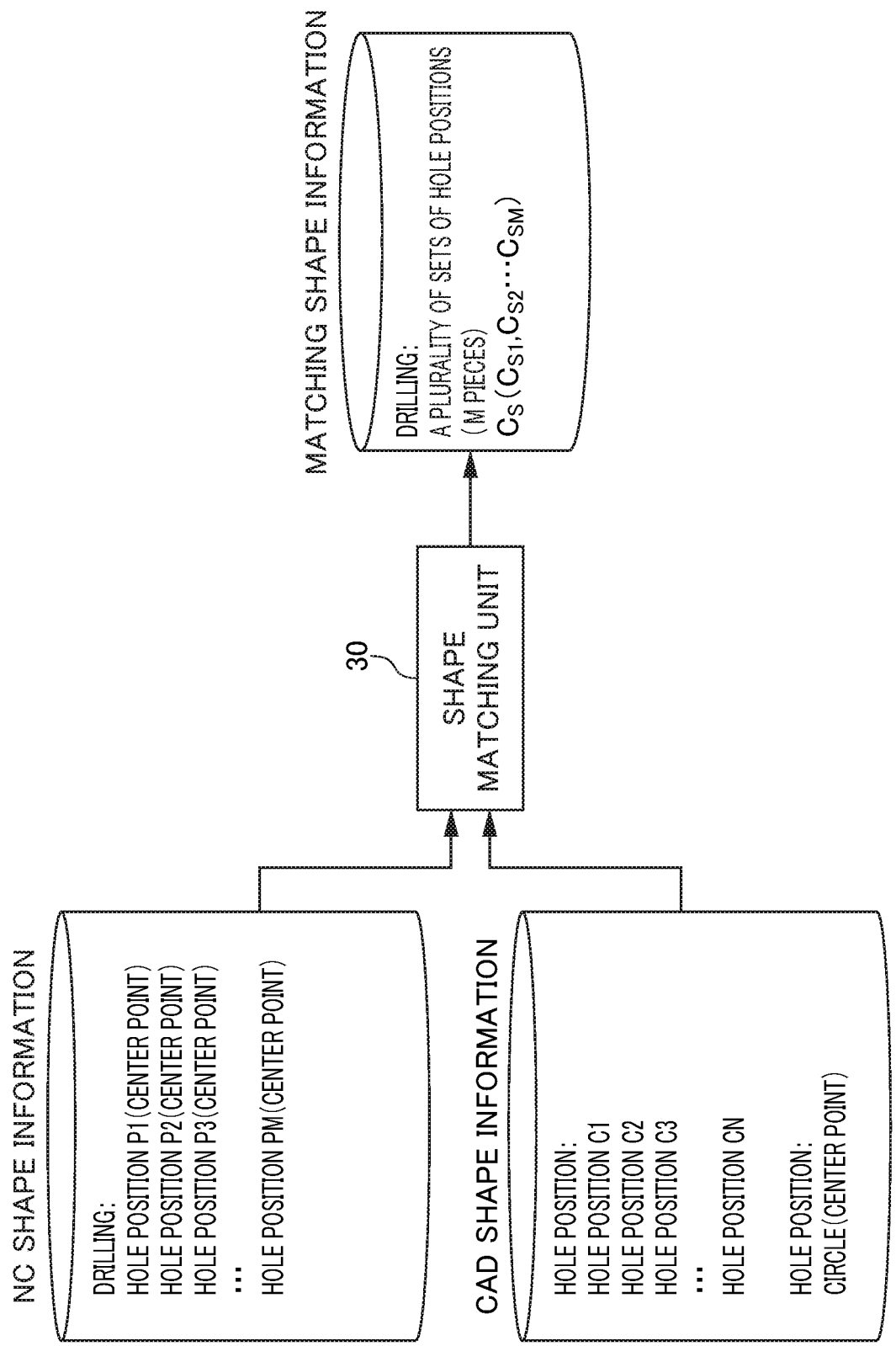

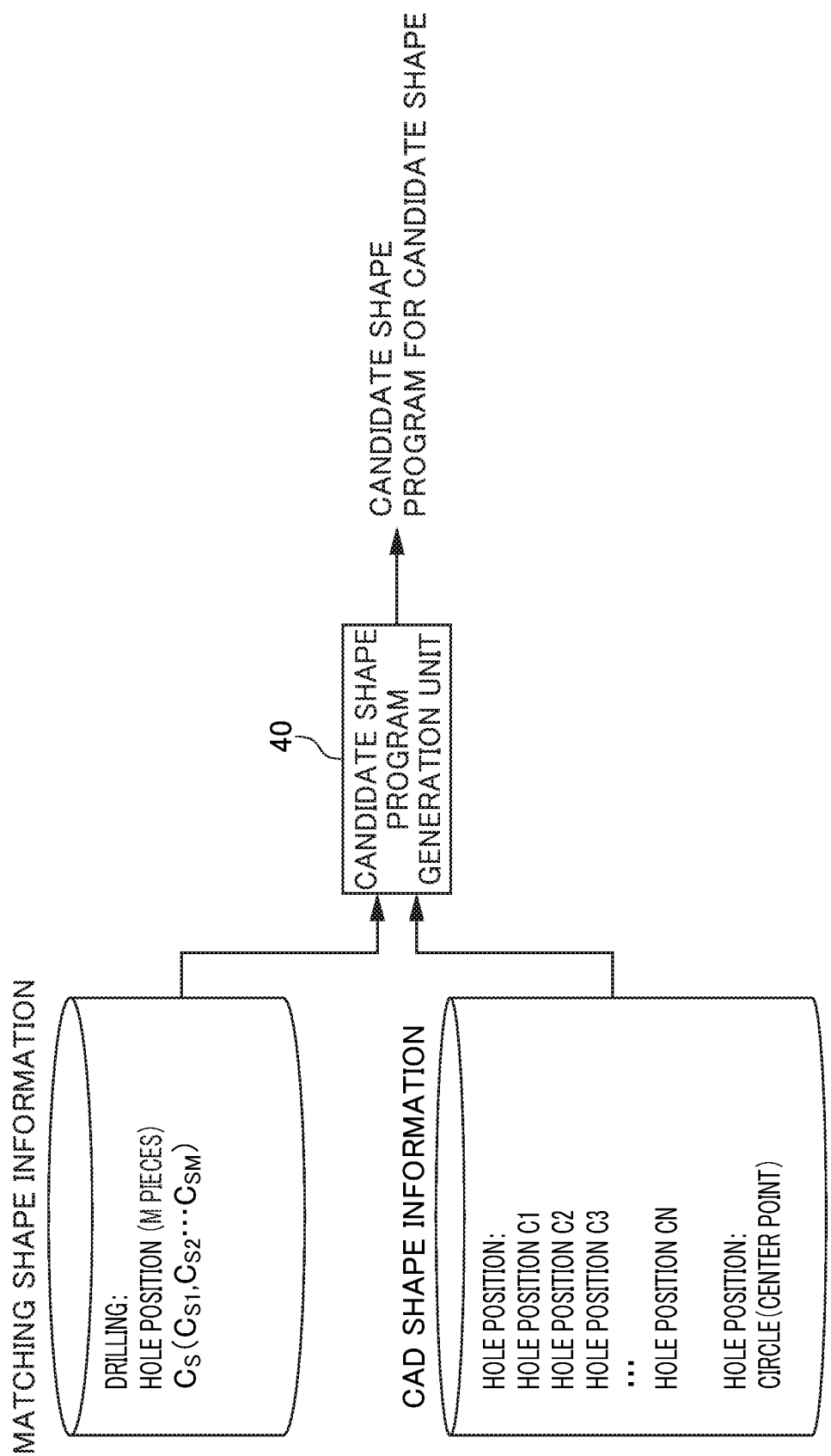

STRAIGHT LINE

QUADRANGLE

LATTICE

ARC

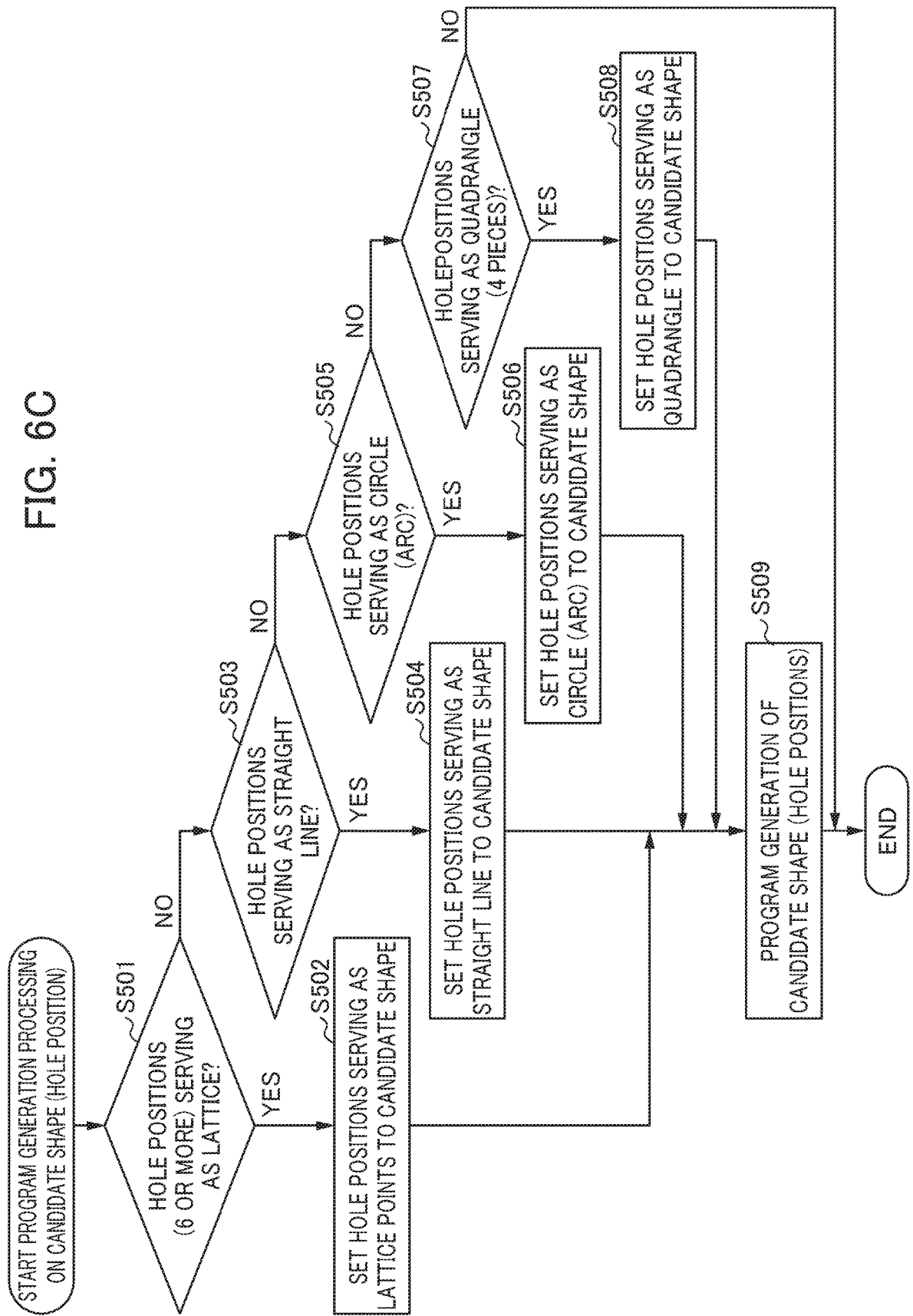

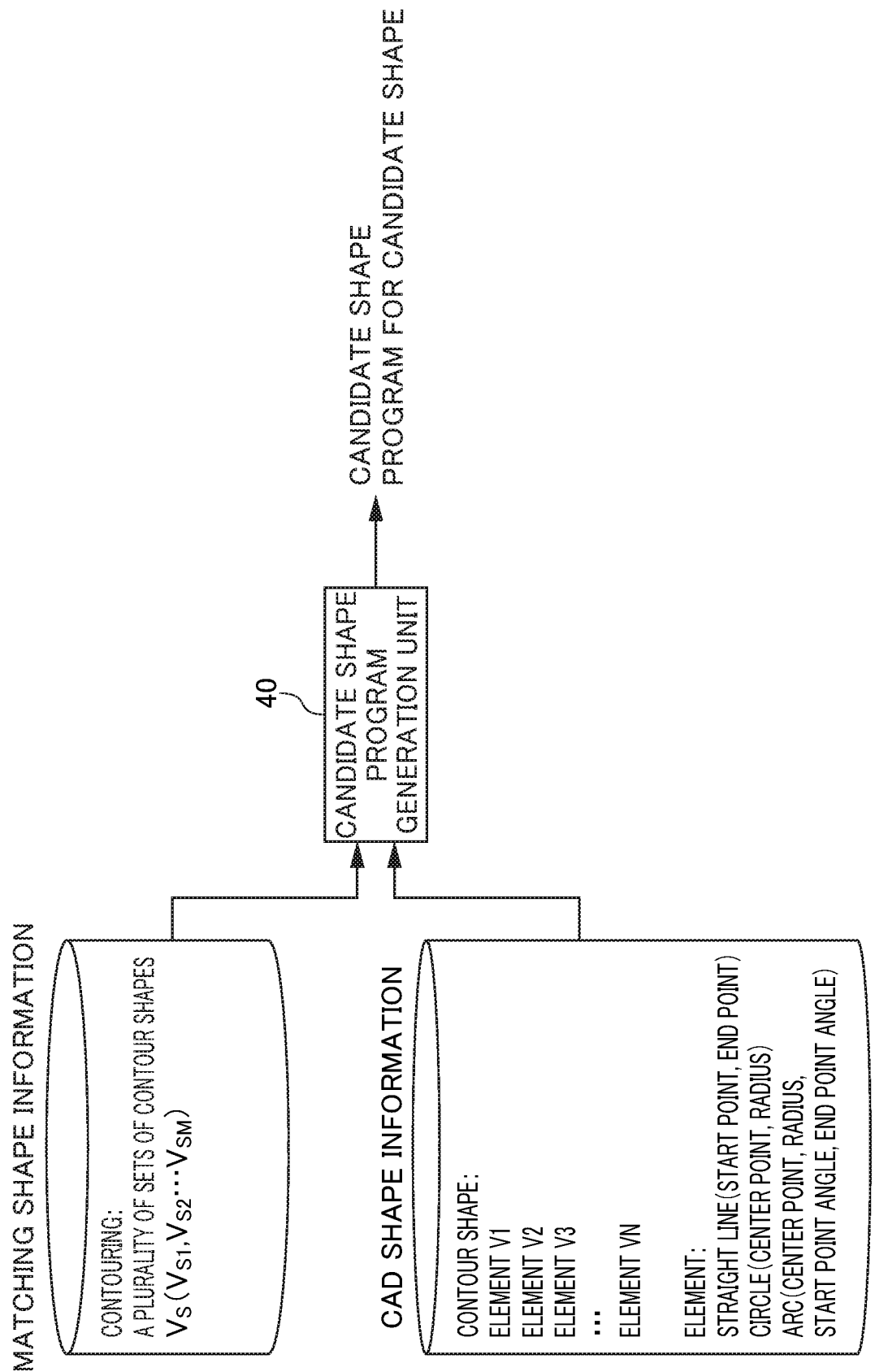

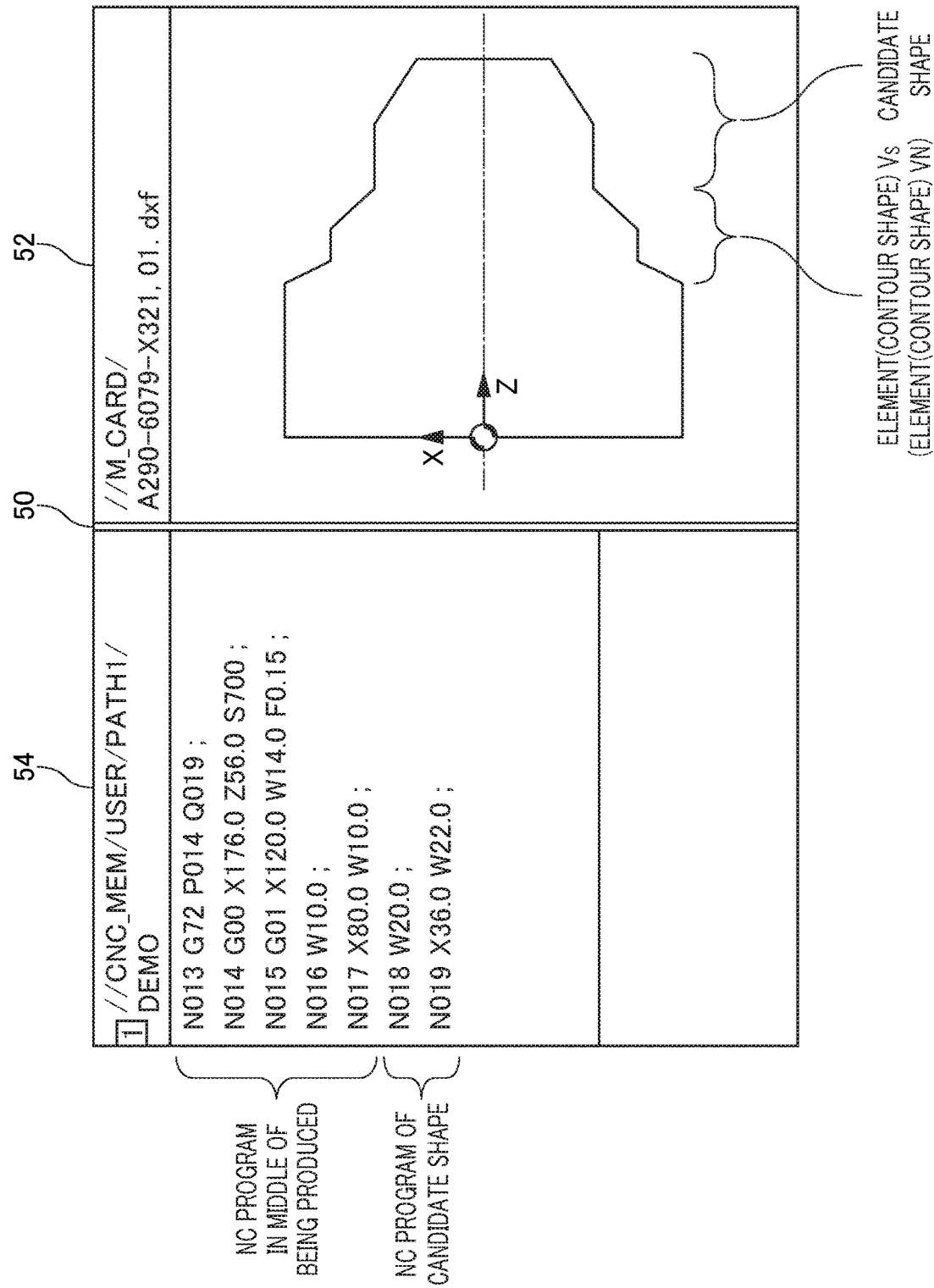

MACHINING PROGRAM GENERATION SUPPORT DEVICE

This application is based on and claims the benefit of priority from Japanese Patent Application No. 2019-147575, filed on 9 Aug. 2019, the content of which is incorporated herein by reference.

BACKGROUND OF THE INVENTION

Field of the Invention

The present invention relates to machining program generation support devices.

Related Art

For example, a technology is known which generates, from the CAD (Computer Aided Design) data of a workplace, a machining program for controlling the operation of an industrial machine such as a machine tool or an industrial robot so as to machine the workpiece (machining target). As the machining program generation technology as described above, a technology of a CAM (Computer Aided Manufacturing) which automatically generates the machining program from the CAD data or the like is known. (see, for example, Patent Document 1).

Patent Document 1: Japanese Unexamined Patent Application, Publication No. H11-66112

SUMMARY OF THE INVENTION

On the other hand, in the case of simple machining, it is likely that for example, without use of a CAM, a CAD drawing is displayed on a CNC (Computer Numerical Control), and that while seeing the CAD drawing, an operator manually generates a machining program. In such a case, when all shapes (machining shapes) of a workpiece are manually input, the efficiency of such an operation is low, and thus the number of input errors is increased.

Hence, a technology is desired which supports, when an operator manually generates a machining program, the generation of the machining program.

A machining program generation support device according to the present disclosure is a machining program generation support device which supports the generation of a machining program for a workpiece from CAD data of the workpiece, and includes: a CAD data analysis unit which analyzes the CAD data so as to obtain CAD shape information serving as the shape information of the workpiece; a machining program analysis unit which analyzes the machining program that is in the middle of being produced by an operator so as to obtain machining shape information serving as the shape information of the workpiece that is in the middle of being produced; a shape matching unit which performs matching of shapes of the CAD shape information obtained with the CAD data analysis unit and the machining shape information that is obtained with the machining program analysis unit and that is in the middle of being produced so as to obtain matching shape information on which shape matching has been performed; a candidate shape program generation unit that predicts, based on the CAD shape information obtained with the CAD data analysis unit, a candidate shape following the matching shape information on which the shape matching has been performed with the shape matching unit, and that thereby predicts a candidate shape following the machining shape information which is in the middle of being produced so as to automatically generate a machining program for the candidate shape following the machining program which is in the middle of being produced; and a display unit which displays the machining program that is in the middle of being produced y the operator and which displays the machining program for the candidate shape that is generated with the candidate shape program generation unit.

According to the present disclosure, it is possible to support, when an operator manually generates a machining program, the generation of the machining program.

BRIEF DESCRIPTION OF THE DRAWINGS

FIG. 2A is a diagram showing examples of an NC program which is in the middle of being produced by an operator and shape information (NC shape information) of a workpiece which is in the middle of being produced in the NC program that is analyzed with an NC program analysis unit;

FIG. 3A is a diagram showing examples of CAD data and shape information (CAD shape information) of the workpiece which is analyzed with a CAD data analysis unit;

FIG. 4A is a diagram showing examples of the NC shape information and the CAD shape information and the shape information of the workpiece (matching shape information) on which shape matching has been performed with a shape matching unit 30 in drilling;

FIG. 6A is a diagram showing examples of the matching shape information and the CAD shape information in drilling;

FIG. 6C is a flowchart showing candidate shape program generation processing (hole positions) performed with the candidate shape program generation unit;

FIG. 10A is a diagram showing examples of the matching shape information and the CAD shape information in contouring;

FIG. 11B is a diagram showing an example of the display which is produced with the CAD data display unit (right side) and the program display unit (left side) in the display unit (contouring).

DETAILED DESCRIPTION OF THE INVENTION

Figure 1:
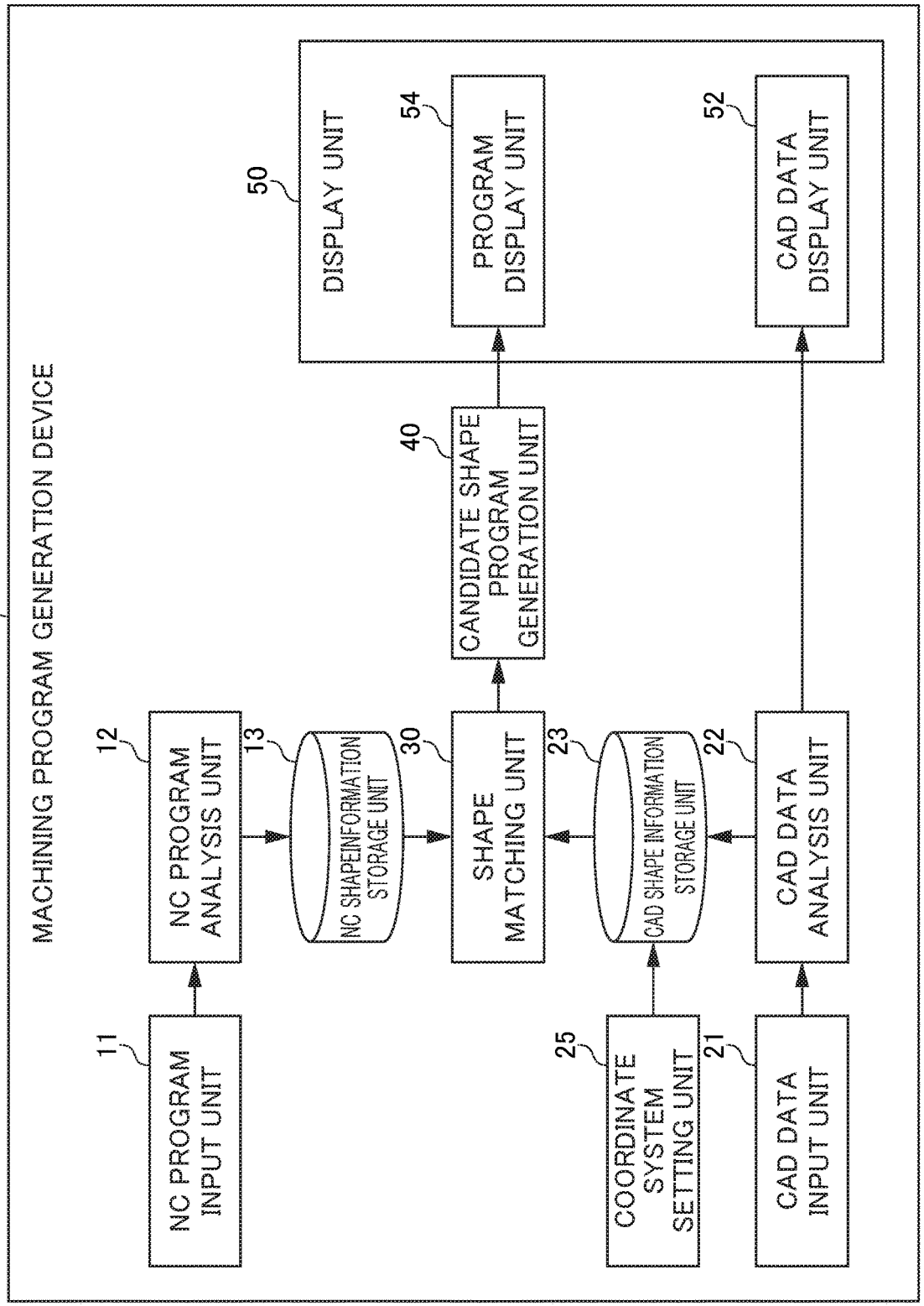
FIG. 1 is a diagram showing a machining program generation support device according to the present embodiment.

An example of the embodiment of the present invention will be described below with reference to accompanying drawings. In the individual drawings, the same or corresponding parts are identified with the same reference numerals.

FIG. 1 is a diagram showing a machining program generation support device according to the present embodiment. The machining program generation support device 1 shown in FIG. 1 is installed in, for example, the numerical controller (Computer Numerical Control: CNC) of a machine tool. The numerical controller controls the operation of the machine tool based on a machining program (hereinafter also referred to as an NC program) so as to machine a workpiece. in the case of simple machining, it is likely that for example, without use of a CAM, a CAD drawing is displayed on the numerical controller, and that while seeing the CAD drawing, an operator manually generates the machining program. When as described above, the operator manually generates the machining program, the machining program generation support device 1 supports the generation of the machining program.

The machining program generation support device 1 includes an NC program input unit 11, an NC program analysis unit (machining program analysis unit) 12, an NC shape information storage unit 13, a CAD data input unit 21, a CAD data analysis unit 22, a CAD shape information storage unit 23, a coordinate system setting unit 25, a shape matching unit 30, a candidate shape program generation unit 40 and a display unit 50, and the display unit 50 includes a CAD data display unit 52 and a program display unit 54.

The NC program input unit 11 inputs the NC program produced by the operator.

The NC program analysis unit 12 analyzes the NC program which is input to the NC program input unit 11 and which is in the middle of being produced by the operator so as to obtain NC shape information (machining shape information) serving as the shape information of the workpiece which is in the middle of being produced in the case of drilling, as will be described later, the NC shape information includes the coordinates of the center point of a hole position whereas in the case of contouring, the NC shape information includes at least one of:

the coordinates of the start point of a straight line and the coordinates of an end point thereof, the coordinates of the center point of a circle and a radius thereof, and the coordinates of the center point of an arc and a radius, a start point angle and an end point angle thereof.

The NC shape information storage unit 13 stores the NC shape information which is analyzed with the NC program analysis unit 12.

The CAD data input unit 21 inputs, for example, the CAD data of the work piece from a CAD.

The CAD data analysis unit 22 analyzes the CAD data so as to obtain CAD shape information serving as the shape information of the workpiece. In the case of drilling, as will be described later, the CAD shape information includes the coordinates of the center point of the hole position whereas in the case of contouring, the CAD shape information. includes at least one of:

the coordinates of the start point of the straight line and the coordinates of the end point thereof, the coordinates of the center point, of the circle and the radius thereof, and the coordinates of the center point of the arc and the radius, the start point angle and the end point angle thereof.

The CAD shape information storage unit 23 stores the CAD shape information which is analyzed with the CAD data analysis unit 22.

Figure 11A:
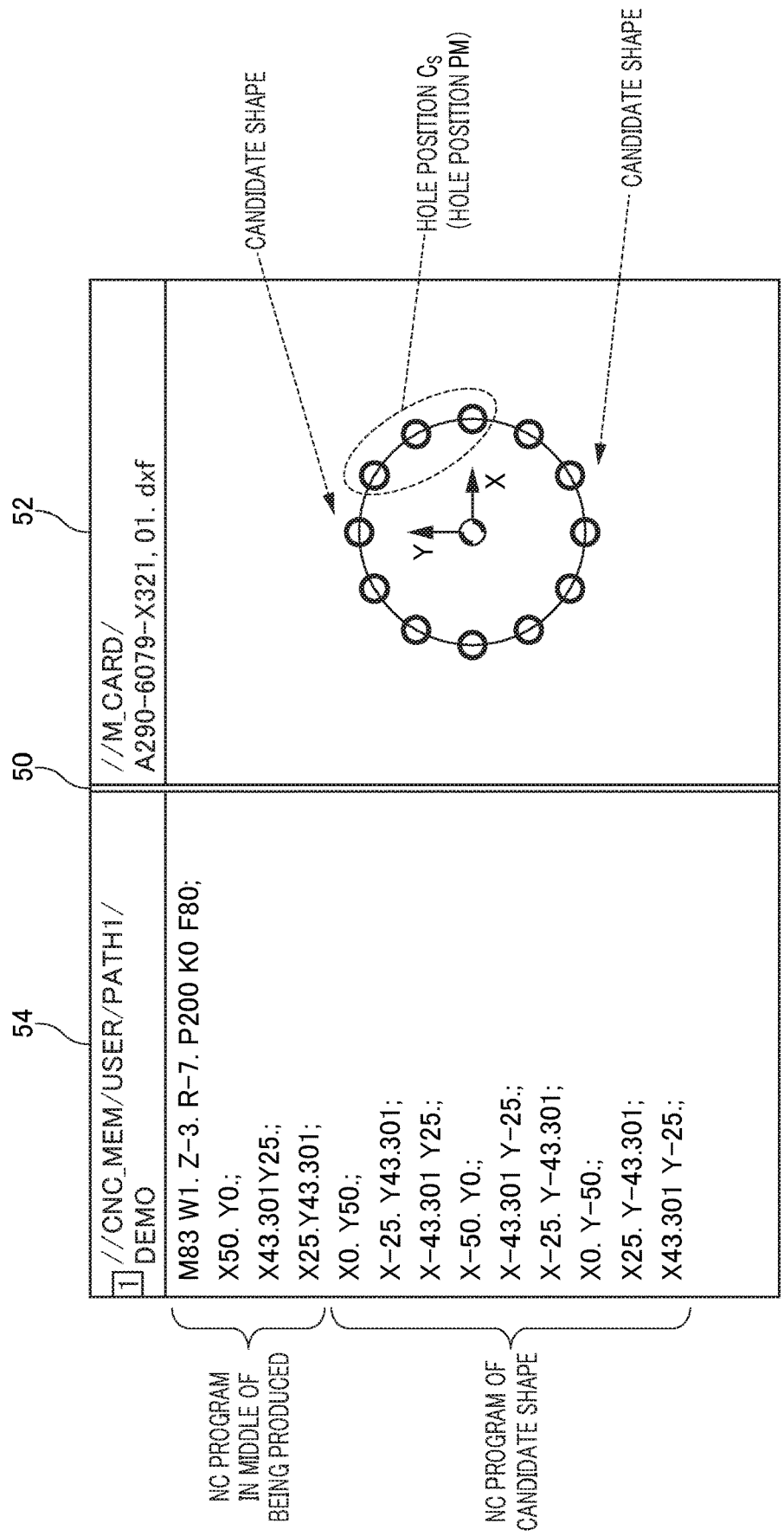
FIG. 11A is a diagram showing an example of a display which is produced with a CAD data display unit (right side) and a program display unit (left side) in a display unit (drilling)

As shown in FIGS. 11A and 11B which will be described later, the coordinate system setting unit 25 sets an XY coordinate system and an origin point on the CAD drawing.

The shape matching unit 30 performs matching of shapes of the NC shape information obtained with the NC program analysis unit 12 and the CAD shape information obtained with the CAD data analysis unit 22 so as to obtain matching shape information on which the shape matching has been performed.

The candidate shape program generation unit 40 predicts, based on the CAD shape information obtained with the CAD data analysis unit 22, a candidate shape following the matching shape information on which the shape matching has been performed with the shape matching unit 30, and thereby predicts a candidate shape following the machining shape information which is in the middle of being produced so as to automatically generate the NC program for the candidate shape following the NC program which is in the middle of being produced.

The CAD data display unit 52 in the display unit 50 displays the CAD date as shown on the right sides of FIGS. 11A and 11B which will be described later. In this way, the operator manually generates the NC program while seeing the CAD drawing. The CAD data display unit 52 displays the matching shape information on which the shape matching has been performed with the shape matching unit 30 (or the machining shape information which is obtained with the NC program analysis unit 12 and which is in the middle of being produced) and the candidate shape which is predicted with the candidate shape program generation unit 40 so as to superimpose them on the CAD data.

The program display unit 54 in the display unit 50 displays, as shown on the left sides of FIGS. 11A and 11B which will be described later, the NC program which is in the middle of being produced by the operator, and displays the NC program for the candidate shape which is generated with the candidate shape program generation unit 40.

The machining program generation support device 1 (except the NC shape information storage unit 13, the CAD shape information storage unit 23 and the display unit 50) is formed with, for example, a computation processor such as a DSP (Digital Signal Processor) or an FPGA (Field-Programmable Gate Array). Various types of functions of the machining program generation support device 1 (except the NC shape information storage unit 13, the CAD shape information storage unit 23 and the display unit 50) are realized, for example, by execution of predetermined software (program, application) stored in the storage unit. The various types of functions of the machining program generation support device 1 (except the NC shape information storage unit 13, the CAD shape information storage unit 23 and the display unit 50) may be realized by the cooperation of hardware and software or may be realized only by hardware (electronic circuit).

The NC shape information storage unit 13 and the CAD shape information storage unit 23 are for example, a rewritable memory such as an EEPROM or a rewritable disk such as a HDD (Hard Disk Drive) or an SSD (Solid State Drive).

The display unit 50 is a display device such as a liquid crystal display.

The operation of the machining program generation support device 1 will then be described. The machining program generation support device 1 first displays, on the CAD data display 52 of the display unit 50, the CAD data of the workpiece (that is, the CAD drawing of the workpiece) which is input (the right sides of FIGS. 11A and 11B which will be described later). Then, the operator manually produces (inputs) the NC program based on the CAD drawing of the workpiece displayed on the CAD data display unit 52. The machining program generation support device 1 displays, on the program display unit 54 of display unit 50, the NC program which is in the middle of being produced (input) by the operator (the left sides of FIGS. 11A and 11B which will be described later). The operations of the individual units of the machining program generation support device 1 will be described in detail below.

(NC Program Analysis)

Figure 2B:
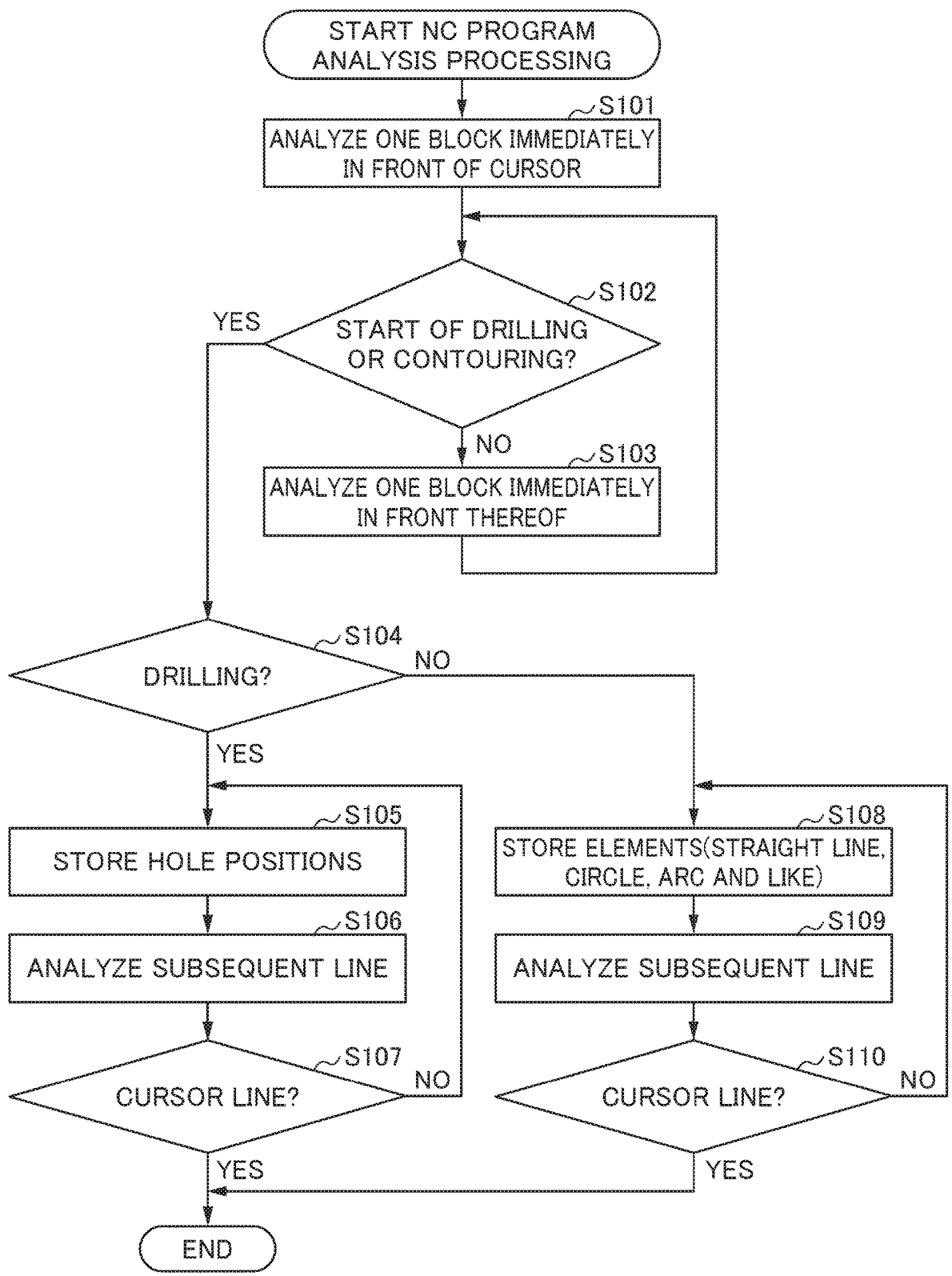
FIG. 2B is a flowchart showing NC program analysis processing which is performed with the NC program analysis unit.

FIG. 2A is a diagram showing examples of the NC program which is in the middle of being produced by the operator and the shape information (hereinafter also referred to as the NC shape information) of the workpiece which is in the middle of being produced in the NC program that is analyzed with the NC program analysis unit. FIG. 2B is a flowchart showing NC program analysis processing which is performed with the NC program analysis unit.

The NC program analysis unit 12 first analyzes one block immediately in front of a cursor in the NC program which is displayed on the program display unit 54 and which is in the middle of being produced by the operator (S101). The NC program analysis unit 12 determines, for example, based on a G-code command, whether or not a machining command is the start of drilling or contouring (for example, an end face rough cutting cycle) (S102). For example, when the C-code command is "G81", the NC program analysis unit 12 determines that the machining command is the start of drilling whereas when the C-code command is "G72", the NC program analysis unit 12 determines that the machining command is the start of contouring.

When in step S103, the machining command is neither the start of drilling nor the start of contouring, the NC program analysis unit 12 analyzes one block immediately in front thereof, that is, the subsequent block (S103), and returns to step S102. As described above, the NC program analysis unit 12 analyzes the NC program which is in the middle of being produced on a block-by-block basis.

When in step S103, the machining command is either the start of drilling or the start of contouring, the NC program analysis unit 12 determines whether or not the machining command is drilling (S104). When the machining command is drilling, the NC program analysis unit 12 stores the first hole position following the machining command in the NC shape information storage unit 13 as the NG shape information (S105).

Then, the NC program analysis unit 12 analyzes the subsequent line (S106) so as to determine whether or not the subsequent line is a cursor line, that is, whether or not the analysis of all shape blocks is completed (S107). When the subsequent line is not the cursor line, the NC program analysis unit 12 returns to step S105 so as to repeat processing from step S105 to step S107. On the other hand, when the subsequent line is the cursor line, the NC program analysis unit 12 completes the analysis.

In this way, in the case of drilling, the NC program analysis unit 12 obtains, as the NC shape information, hole positions P1, P2, P3, ... and PM (for example, the center points) which are produced (input) by the operator. Here, M is an arbitrary integer which is equal to or greater than 2 and less than N (N will be described later).

On the other hand, when in step S104, the machining command is not drilling, that is, when the machining command is contouring, the NC program analysis unit 12 stores, as the NC shape information, the first element following the machining command in the NC shape information storage unit 13 (S108). Examples of the element include (the start point, the end point) of a straight line "G01", (the center point, the radius) of a circle "G02", (the center point, the radius, the start point angle, the end point angle) of an arc "G03" and the like.

Then, the NC program analysis unit. 12 analyzes the subsequent line (S109) so as to determine whether or not the subsequent line is the cursor line, that is, whether or not the analysis of all shape blocks is completed (S110). When the subsequent line is not the cursor line, the NC program analysis unit 12 returns to step S108 so as to repeat processing from step S108 to step S110. On the other hand, when the subsequent line is the cursor line, the NC program analysis unit 12 completes the analysis.

In this way, in the case of contouring, the NC program analysis unit 12 obtains, as the NC shape information, elements E1, E2, E3, ... and EM which are produced (input) by the operator. Here, N is an arbitrary integer which is equal to or greater than 2 and less than N (N will be described later). Examples of the element include, as described above, (the start point, the end point) of a straight line, (the center point, the radius) of a circle, (the center point, the radius, the start point angle, the end point angle) of an arc and the like.

(CAD Data Analysis)

Figure 3B:
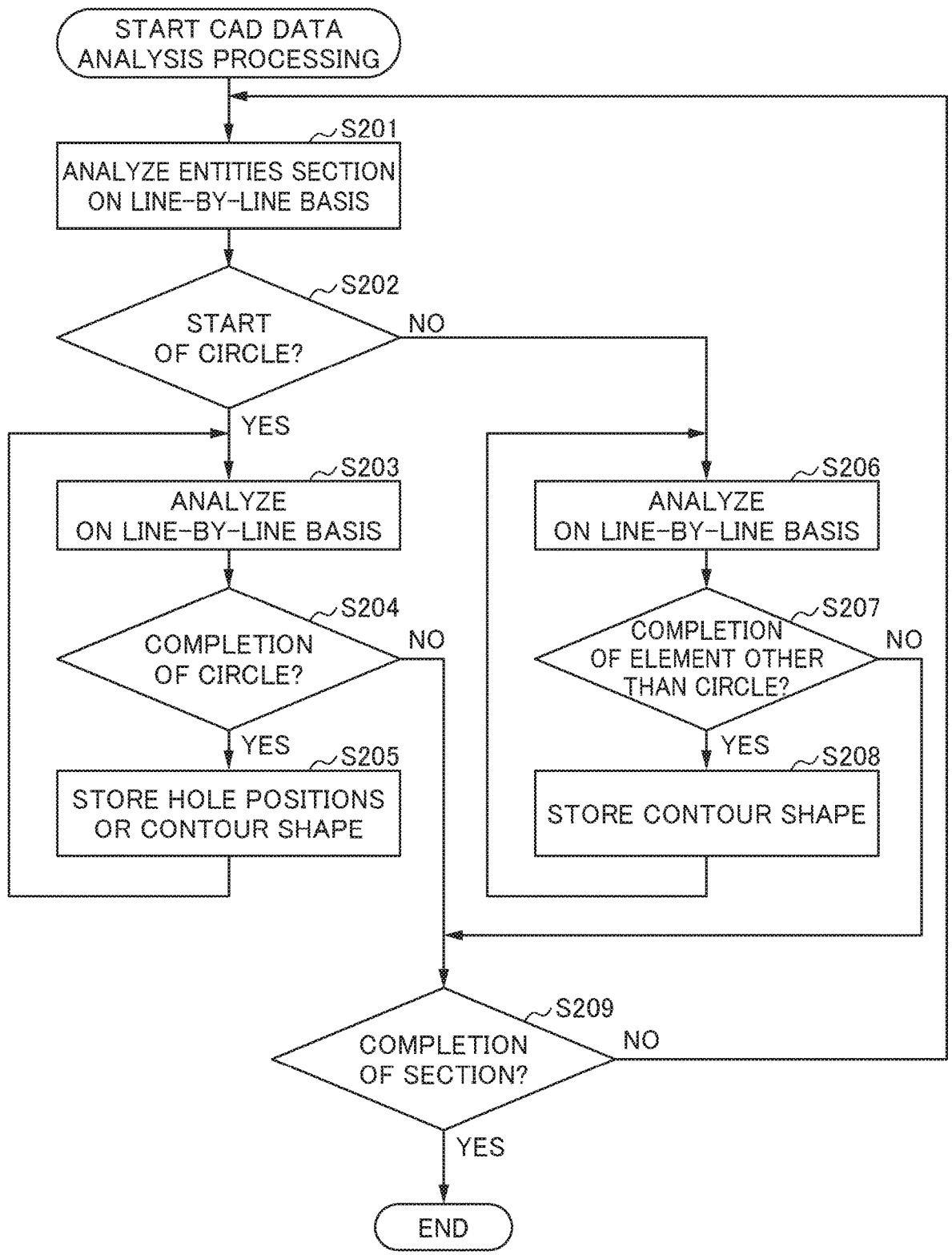
FIG. 3B is a flowchart showing CAD data analysis processing which is performed with the CAD data analysis unit.

FIG. 3A is a diagram showing examples of the CAD data (CAD file) and the shape information (hereinafter also referred to as the CAD shape information) of the workpiece which is analyzed with the CAD data analysis unit. FIG. 3B is a flowchart showing CAD data analysis processing which is performed with the CAD data analysis unit.

The CAD data analysis unit 22 first analyzes ENTITIES SECTION (component object) in the CAD data on a line-by-line basis (S201) so as to determine whether or not ENTITIES SECTION is the start of CIRCLE, that is, whether or not ENTITIES SECTION is the start of a circular shape (S202). When ENTITIES SECTION is the start of CIRCLE, the CAD data analysis unit 22 analyzes this SECTION in the CAD data on a line-by-line basis (S203) so as to determine whether or not ENTITIES SECTION is the completion of CIRCLE, that is, whether or not ENTITIES SECTION is the completion of the circular shape (S204). When ENTITIES SECTION is not the completion of CIRCLE, the CAD data analysis unit 22 stores, as the CAD shape information, the hole positions or a contour shape in the CAD shape information storage unit 23 (S205). Thereafter, the CAD data analysis unit 22 returns to step S203 so as to repeat processing from step S203 to step S205.

In this way, in the case of the hole positions, the CAD data analysis unit 22 obtains, as the CAD shape information, hole positions C1, C2, C3, ... and CN (for example, the center points) in the CAD data. Here, N is an arbitrary integer which is equal to or greater than 2 (N>M).

In the case of the contour shape, the CAD data analysis unit 22 obtains, as the CAD shape information, elements V1, V2, V3, ... and VN in the CAD data. Here, N is an arbitrary integer which is equal to or greater than 2 (N>M). Examples of the element include, as described above, (the start point, the end point) of a straight line, (the center point, the radius) of a circle, (the center point, the radius, the start point angle, the end point angle) of an arc and the like.

On the other hand, when in step S202, ENTITIES SECTION is not the start of CIRCLE, that is, ENTITIES SECTION is the start of an element other than CIRCLE, the CAD data analysis unit 22 analyzes this SECTION in the CAD data on a line-by-line basis (S206) so as to determine whether or not ENTITIES SECTION is the completion of the element other than CIRCLE (S207). When ENTITIES SECTION is not the completion of the element other than CIRCLE, the CAD data analysis unit 22 stores, as the CAD shape information, the contour shape in the CAD shape information storage unit 23 (S208). Thereafter, the CAD data analysis unit 22 returns to step S206 so as to repeat processing from step S206 to step S208.

In this way, the CAD data analysis unit 22 obtains, as the CAD shape information, elements V1, V2, V3, ... and VN in the CAD data.

When in step S204, ENTITIES SECTION is the completion of CIRCLE, and in step S207, ENTITIES SECTION is the completion of the element other than CIRCLE, the CAD data analysis unit. 22 determines whether or not ENTITIES SECTION is completed in the CAD data (S209). When ENTITIES SECTION is not completed, the CAD data analysis unit 22 returns to step S201 so as to perform processing from step S201 to step S209 on the subsequent ENTITIES SECTION. On the other hand, when ENTITIES SECTION is completed, the CAD data analysis unit 22 completes the analysis.

(Shape Matching) (Hole Positions)

Figure 4B:
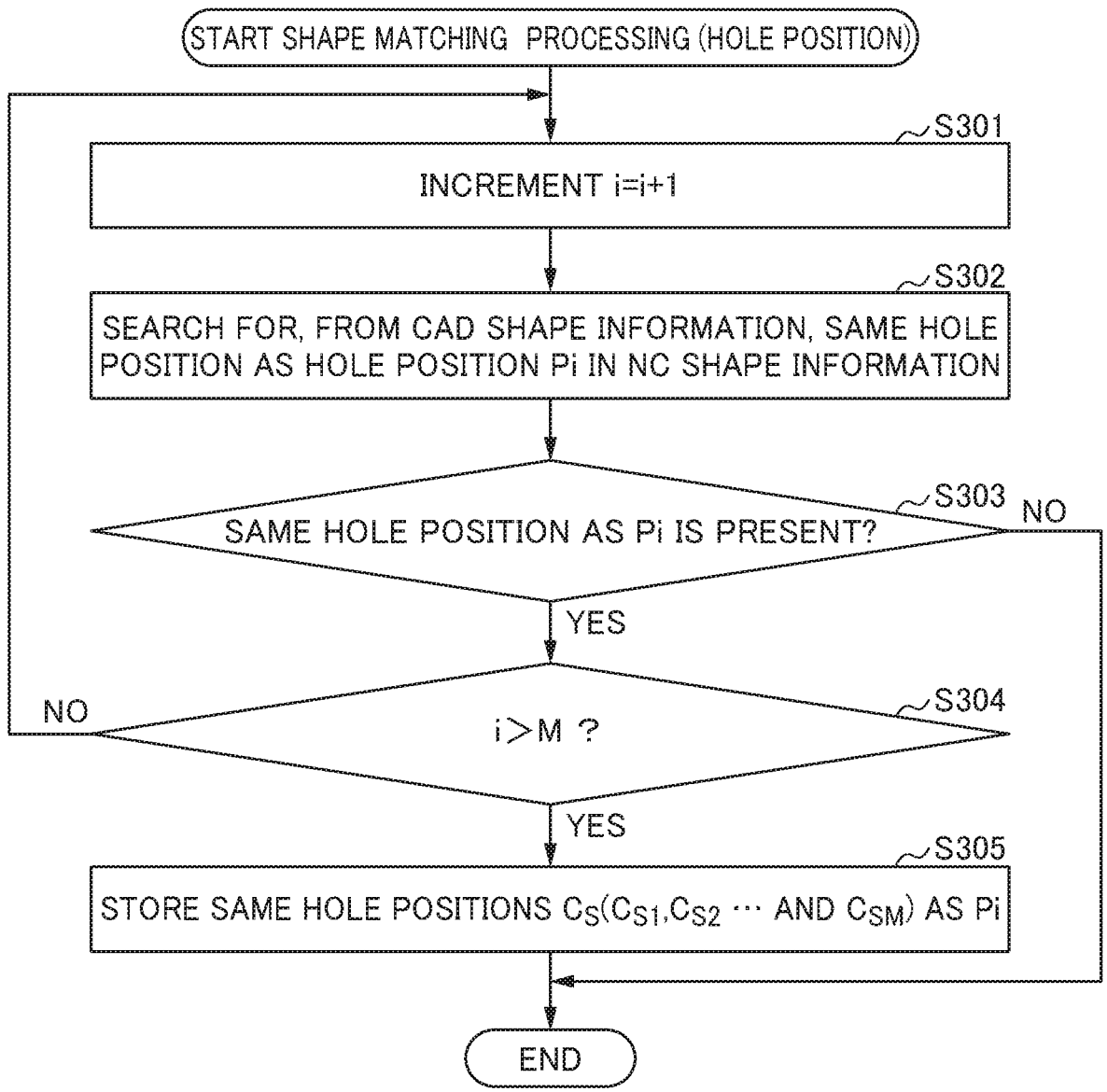
FIG. 4B is a flowchart showing shape matching processing (hole positions) which is performed with the shape matching unit.

FIG. 4A is a diagram showing examples of the NC shape information and the CAD shape information and the shape information of the workpiece (hereinafter also referred to as the matching shape information) on which the shape matching has been performed with the shape matching unit 30 in drilling. FIG. 4B is a flowchart showing shape matching processing (hole positions) which is performed with the shape matching unit.

The shape matching unit 30 first increments the number of times of repetition processing i (S301). Then, the shape matching unit 30 searches for the same hole position as a hole position Pi in the NC shape information from the CAD shape information (S302), and determines whether or not the same hole position as the hole position Pi in the NC shape information is present in the CAD shape information (S303). When the same hole position as the hole position Pi is not present, the shape matching unit 30 completes the shape matching.

When in step S303, the same hole position as the hole position Pi is present, the shape matching unit 30 determines whether or not the number of times of repetition processing i is greater than the number M of hole positions in the NC shape information (S304). When i≤M, the shape matching unit 30 returns to step S301 so as to repeat processing from step S301 to step S304.

When in step S304, i>N, the shape matching unit 30 stores the same hole positions $C_S$ ($C_{S1}$, $C_{S2}$, ... and $C_{SM}$) in the CAD shape information as the hole position Pi in the NC shape information (S305), and completes the shape matching.

In this way, in the case of drilling, the shape matching unit 30 obtains a plurality of sets of hole positions (M pieces) $C_S$ ($C_{S1}$, $C_{S2}$, ... and $C_{SM}$) as the matching shape information.

(Shape Matching) (Contour Shape)

Figure 5A:
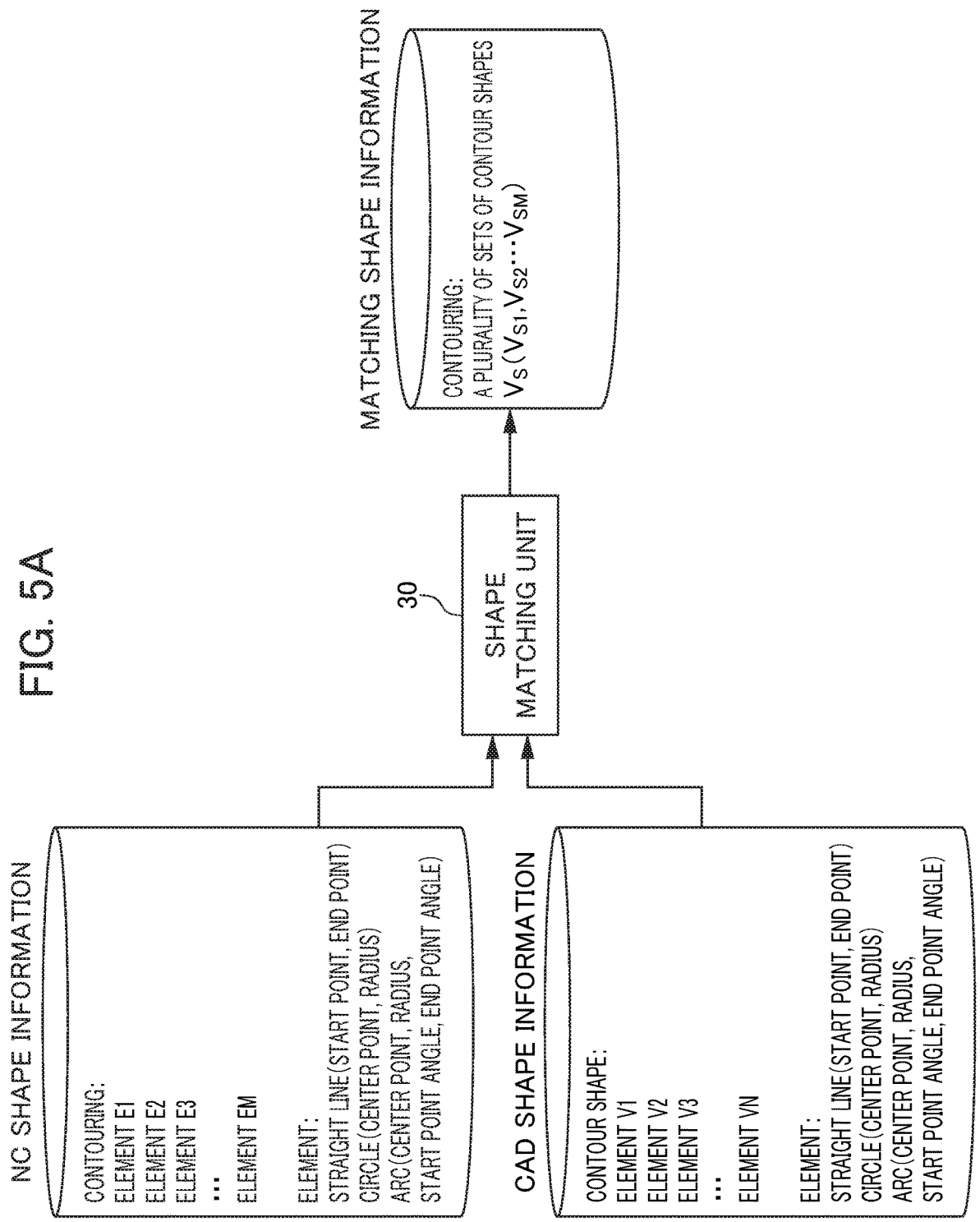
FIG. 5A is a diagram showing examples of the NC shape information and the CAD shape information and the shape information of the workpiece (matching shape information) on which the shape matching has been performed with the shape matching unit 30 in contouring.
Figure 5B:
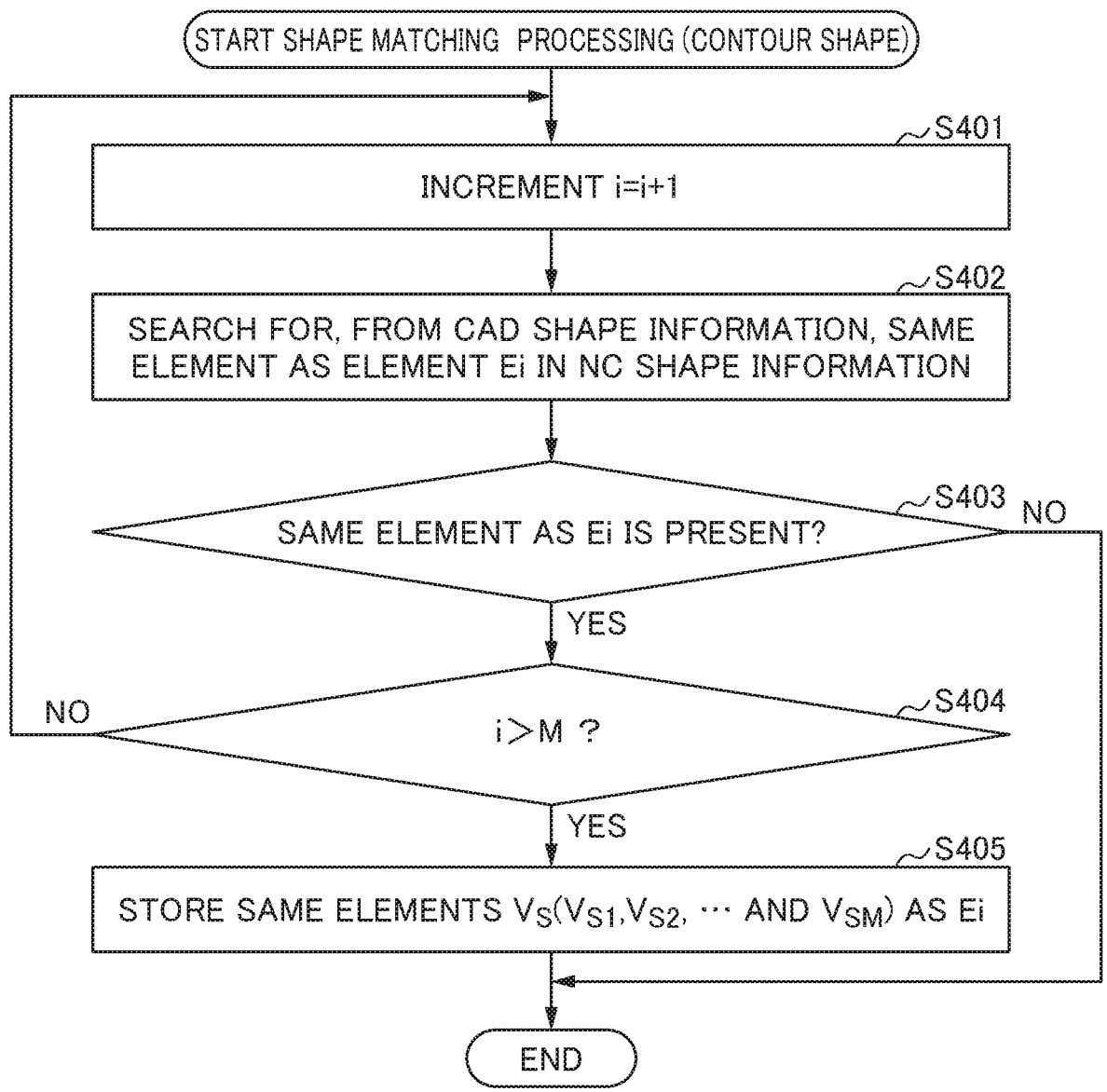
FIG. 5B a flowchart showing shape matching processing (contour shape) which is performed with the shape matching unit.

FIG. 5A is a diagram showing examples of the NC shape information and the CAD shape information and the shape information of the workpiece (hereinafter also referred to as the matching shape information) on which the shape matching has been performed with the shape matching unit 30 in contouring. FIG. 5B is a flowchart showing shape matching processing (contour shape) which is performed with the shape matching unit.

The shape matching unit 30 first increments the number of times of repetition processing i (S401). Then, the shape matching unit 30 searches for the same element as an element Ei in the NC shape information from the CAD shape information (S402), and determines whether or not the same element as the element Ei in the NC shape information is present in the CAD shape information (S403). When the same element as the element Ei is not present, the shape matching unit 30 completes the shape matching.

When in step S403, the same element as the element Ei is present, the shape matching unit 30 determines whether or not the number of times of repetition processing is greater than the number M of elements in the NC shape information (S404). When i≤M, the shape matching unit 30 returns to step S401 so as to repeat processing from step S401 to step 3404.

When in step S404, i>M, the shape matching unit 30 stores the same elements $V_S$ ($T_{S1}$, $V_{S2}$, and $V_{SM}$) in the CAD shape information as the element Ei in the NC shape information (S405), and completes the shape matching.

In this way, in the case of contouring, the shape matching unit 30 obtains a plurality of sets of contour shapes $V_S$ ($V_{S1}$, $V_{S2}$, ... and $V_{SM}$) as the matching shape information.

(Candidate Shape Program Generation) (Hole Positions)

Figure 6B:
FIG. 6B is a diagram showing examples of a candidate shape (a lattice, a straight line, a circle (arc) and a quadrangle) which is generated with the matching shape information, the CAD shape information or a candidate shape program generation unit in drilling.
Figure 6B:
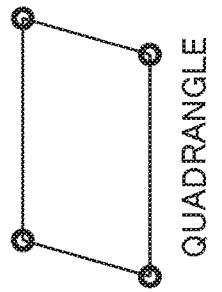
Figure 6B:
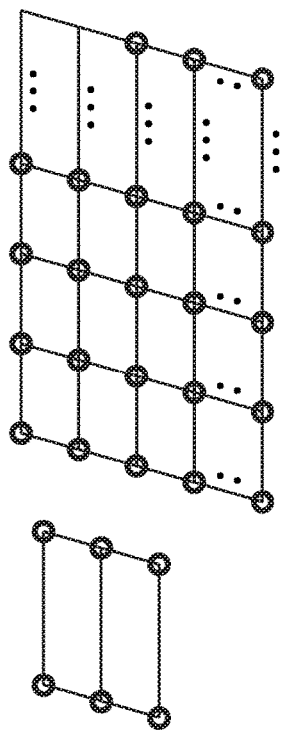
Figure 6B:
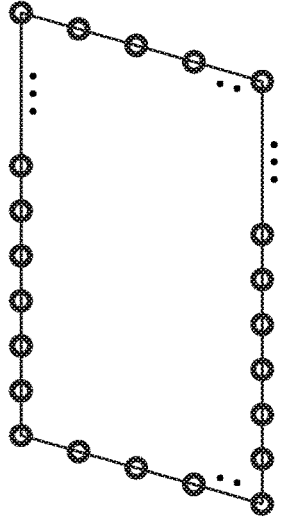
Figure 6B:
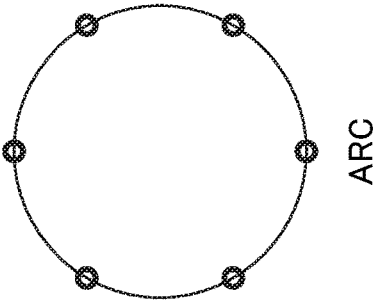

FIG. 6A is a diagram showing examples of the matching shape information and the CAD shape information in drilling, and FIG. 6B is a diagram showing examples of the candidate shape (a lattice, a straight line, a circle (arc) and a quadrangle) which is generated with the matching shape information, the CAD shape information or the candidate shape program generation unit in drilling. FIG. 6C is a flowchart showing candidate shape program generation processing (hole positions) performed with the candidate shape program generation unit.

The candidate shape program generation unit 40 first determines whether or not hole positions (six or more) serving as a lattice are present in the matching shape information (S501). When hole positions serving as a lattice are present, the candidate shape program generation unit 40 predicts hole positions serving as lattice points in the CAD shape information following the hole positions serving as lattice points in the matching shape information, and sets them to a candidate shape (S502).

When in step S501, hole positions serving as a lattice are not present, the candidate shape program generation unit 40 determines whether or not hole positions serving using as a straight line are present in the matching shape information (S503). When hole positions serving as a straight line are present, the candidate shape program generation unit 40 predicts hole positions serving as a straight line in the CAD shape information following the hole positions serving as a straight line in the matching shape information, and sets them to a candidate shape (S504).

When in step S503, hole positions serving as a straight line are not present, the candidate shape program generation unit 40 determines whether or not hole positions serving as a circle (arc) are present in the matching shape information (S505). When hole positions serving as a circle (arc) are present, the candidate shape program generation unit 40 predicts hole positions serving as a circle (arc) in the CAD shape information following the hole positions serving as a circle (arc) in the matching shape information, and sets them to a candidate shape (S506).

When in step S505, hole positions serving as a circle (arc) are not present, the candidate shape program generation unit 40 determines whether or not hole positions serving as a quadrangle are present in the matching shape information (S507). When hole positions serving as a quadrangle are present, the candidate shape program generation unit 40 predicts hole positions serving as a quadrangle in the CAD shape information following the hole positions serving as a quadrangle in the matching shape information, and sets them to a candidate shape (S508).

When the candidate shape is determined, the candidate shape program generation unit 40 automatically generates a program for the candidate shape (hole positions) (S509), and completes the program generation processing.

Figure 7A:
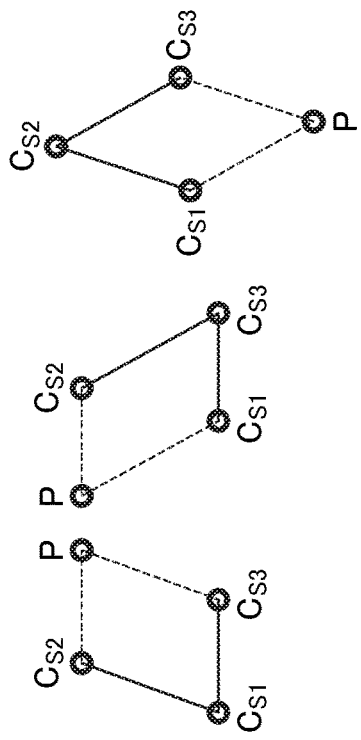
FIG. 7A is a diagram showing examples of determination of the candidate shape of the hole positions serving as lattice points.
Figure 7A:
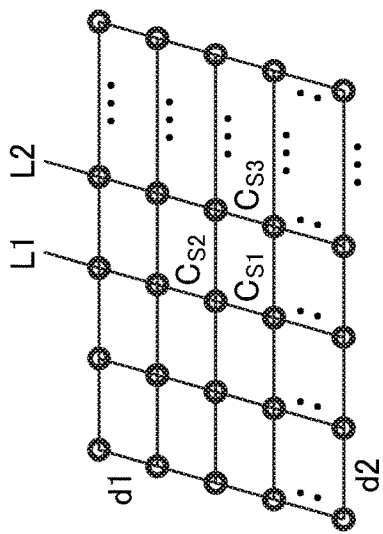
Figure 7A:
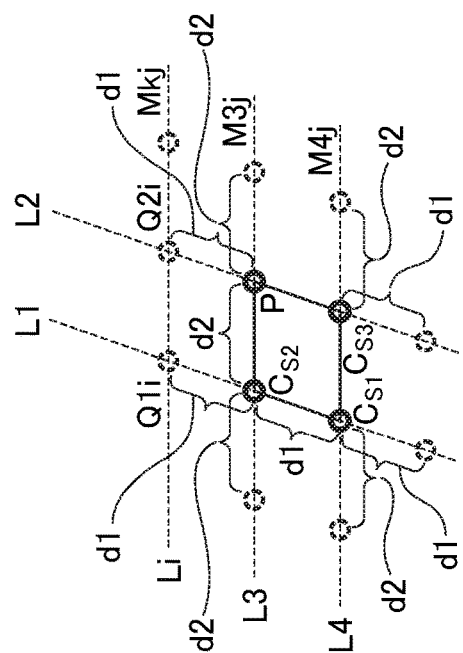
Figure 7B:
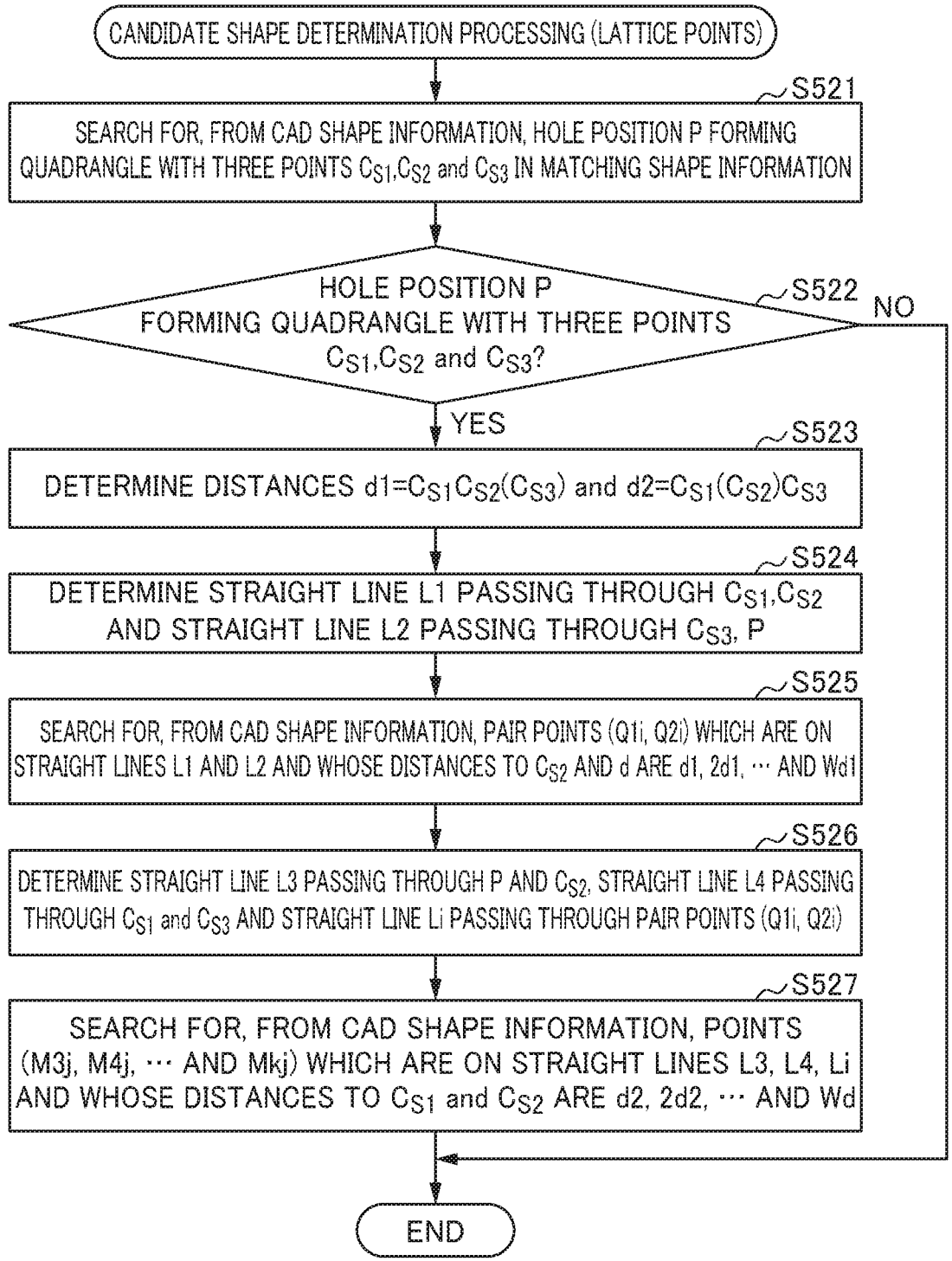
FIG. 7B is a flowchart showing an example of the determination processing of the candidate shape of the hole positions serving as the lattice points.

The details of the determination of the candidate shape of the hole positions serving as the lattice points in step S502 of FIG. 6C will then be described. FIG. 7A is a diagram showing examples of the determination of the candidate shape of the hole positions serving as the lattice points. FIG. 7B is a flowchart showing an example of the determination processing of the candidate shape of the hole positions serving as the lattice points.

The candidate shape program generation unit 40 first searches for, from the CAD shape information, a hole position P which forms a quadrangle together with three points $C_{S1}$, $C_{S2}$ and $C_{S3}$ in the matching shape information (S521) so as to determine whether or not a hole position P is present which forms a quadrangle together with the three points $C_{S1}$, $C_{S2}$ and $C_{S3}$ in the CAD shape information (S522). When a hole position which forms a quadrangle is not present, the candidate shape program generation unit 40 completes the determination processing of the candidate shape.

When a hole position P which forms a quadrangle is present, the candidate shape program generation unit 40 determines a distance d1 between the hole positions $C_{S1}$ and $C_{S2}$ (or between the hole positions $C_{S2}$ and $C_{S3}$ or between the hole positions $C_{S1}$ and $C_{S3}$) and a distance d2 between the hole positions $C_{S1}$ and $C_{S3}$ (or between the hole positions $C_{S1}$ and $C_{S2}$ or between the hole positions $C_{S2}$ and $C_{S3}$) (S523).

Then, the candidate shape program generation unit 40 determines a straight line L1 which passes between the hole positions $C_{S1}$ and $C_{S2}$ and a straight line L2 which passes through the hole position $C_{S3}$ and the hole position P (S524).

Then, the candidate shape program generation unit 40 searches for, from the CAD shape information, pair points (Q1i, Q2i) which are on the straight lines L1 and 12 and in which distances to the hole position $C_{S2}$ and the hole position P are d1, 2d1, . . . and Wd1 (S525).

Then, the candidate shape program generation unit 40 determines a straight line L3 which passes through the hole position $C_{S2}$ and the hole position P, a straight line L4 which passes between the hole positions $C_{S1}$ and $C_{S3}$ and a straight line Li which passes through the pair points (Q1i, Q2i) (S526).

Then, the candidate shape program generation unit 40 searches for, from the CAD shape information, points (M3j, M4j, . . . and Mkj) which are on the straight lines L3, L4 and Li and in which distances to the hole positions $C_{S1}$ and $C_{S2}$ are d2, 2d2, . . . and Wd2 (S527).

Figure 8A:
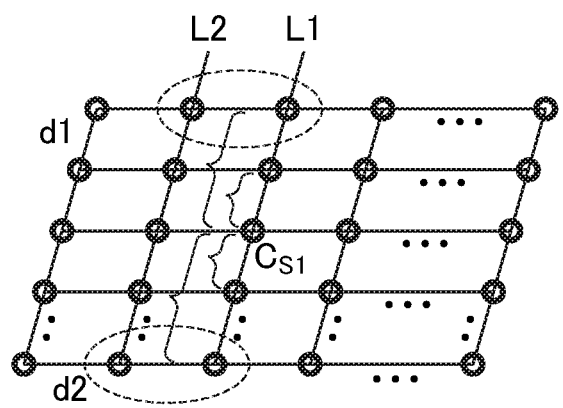
FIG. 8A is a diagram showing another example of the determination of the candidate shape of the hole positions serving as lattice points.
Figure 8B:
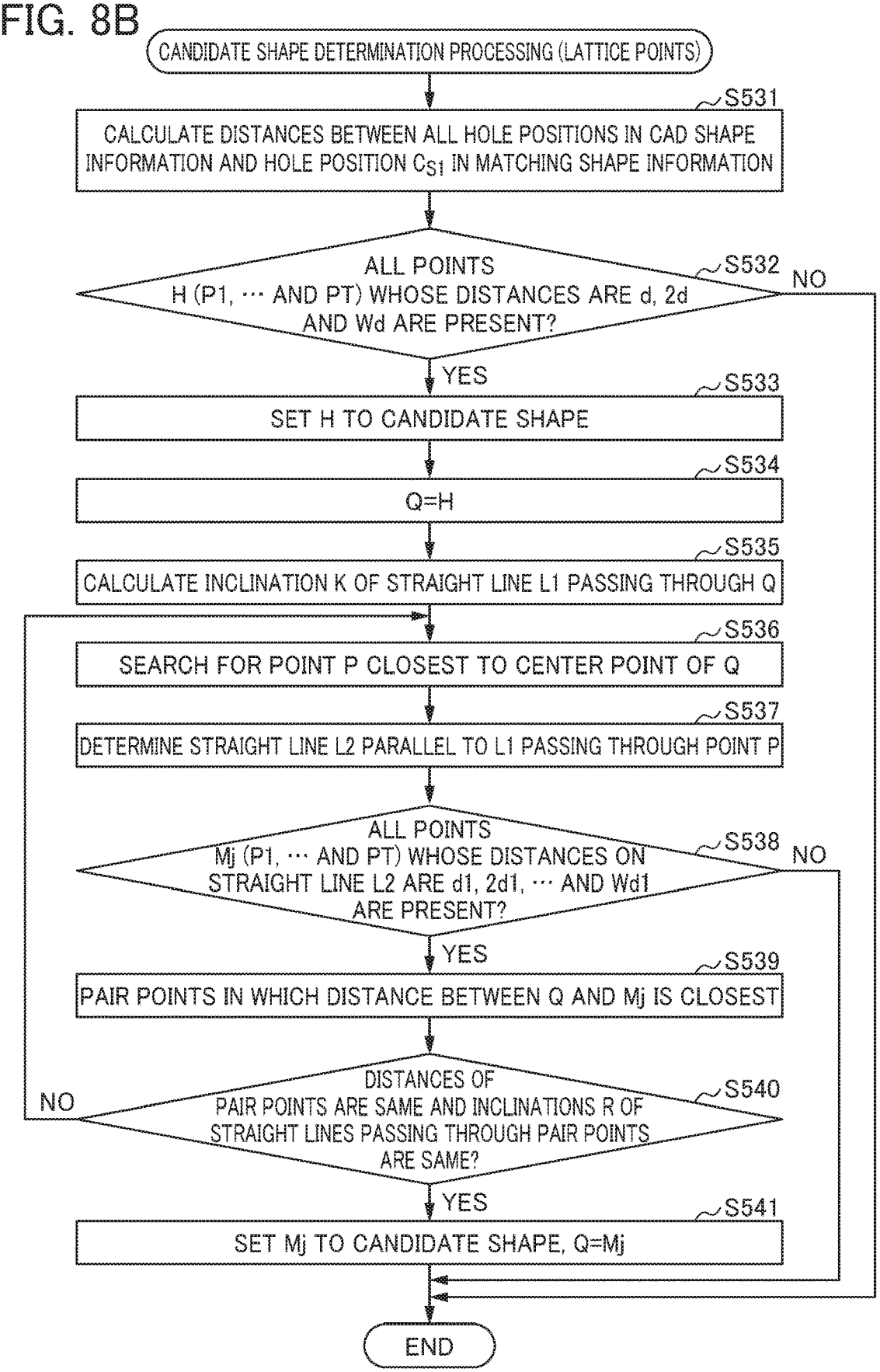
FIG. 8B is a flowchart showing another example of the determination processing of the candidate shape of the hole positions serving as the lattice points.

FIG. 8A is a diagram showing another example of the determination of the candidate shape of the hole positions serving as the lattice points. FIG. 8B is a flowchart showing another example of the determination processing of the candidate shape of the hole positions serving as the lattice points.

The candidate shape program generation unit 40 first calculates distances between all the hole positions in the CAD shape information and the hole position $C_{S1}$ in the machining shape information (S531). Then, the candidate shape program generation unit 40 determines whether or not all points H (P1, . . . and PT) (here, T>1) are present whose distances to the hole position $C_{S1}$ in the matching shape information are d, 2d, . . . and Wd (S532). When not all points H are present, the candidate shape program generation unit 40 completes the determination processing of the candidate shape.

When all points H are present, the candidate shape program generation unit 40 sets the points H to the candidate shape (S533), and assumes that the hole position Q=H (S534).

Then, the candidate shape program generation unit 40 calculates the inclination K of a straight line L1 which passes through the hole position Q (S535). Then, the candidate shape program generation unit 40 searches for a point P which is closest to the center point of the hole position Q (S536). Then, the candidate shape program generation unit 40 determines a straight line L2 parallel to the straight line L1 passing through the point P (S537). Then, the candidate shape program generation unit 40 determines whether or not all points Mj (P1, . . . and PT) are present which are on the straight line L2 and whose distances are d1, 2d1, . . . and Md1 (S538). When not all points Mj are present, the candidate shape program generation unit 40 completes the determination processing of the candidate shape.

When all points Mj are present, the candidate shape program generation unit 40 sets, to pair points, points in which the distances between the point Q and the points Mj are closest (S539). Then, the candidate shape program generation unit 40 determines whether or not the distances of the pair points are the same and whether or not the inclinations R of straight lines passing through the pair points are the same (S540). When the distances of the pair points are the same and the inclinations R of the straight lines passing through the pair points are not the same, the candidate shape program generation unit 40 returns to step S536 so as to repeat processing from step S536 to step S540.

When the distances of the pair points are the same and the inclinations R of the straight lines passing through the pair points are the same, the candidate shape program generation unit 40 sets the points Mj to the candidate shape (Q=Mj) (S541).

With consideration given to the amount of calculation, the examples of the determination of the candidate shape of the hole positions serving as the lattice points shown in FIGS. 7A and 7B are preferable.

Figure 9A:
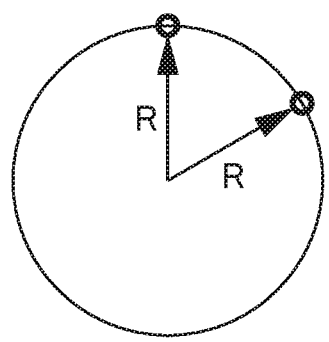
FIG. 9A is a diagram showing an example of determination of the candidate shape of the hole positions serving as the circle (arc)
Figure 9B:
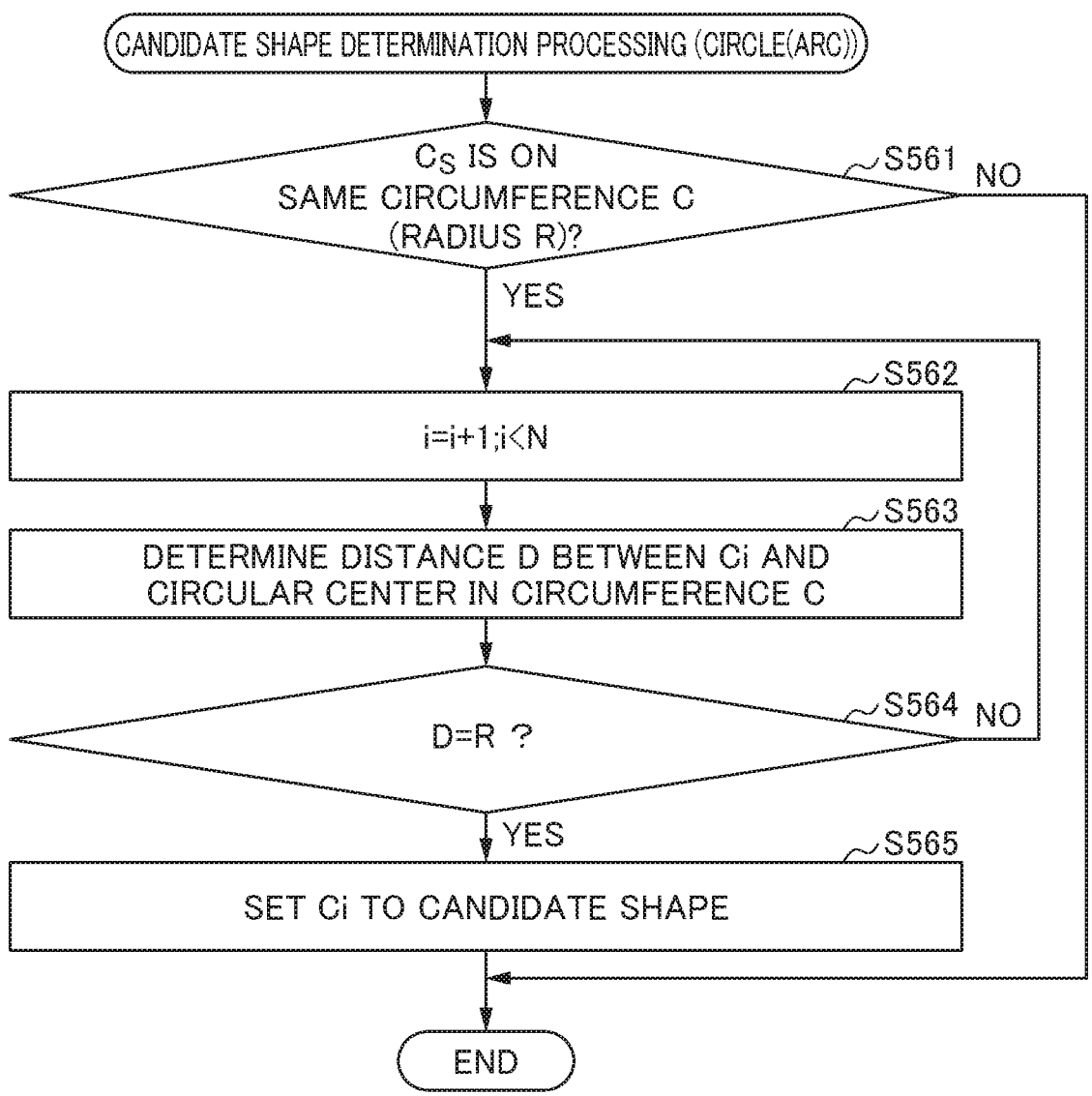
FIG. 9B is a flowchart showing an example of the determination processing of the candidate shape of the hole positions serving as the circle (arc)

The details of the determination of the candidate shape of the hole positions serving as the circle (arc) in step S506 of FIG. 6C will then be described. FIG. 9A is a diagram showing an example of the determination of the candidate shape of the hole positions serving as the circle (arc). FIG. 9B is a flowchart showing an example of the determination processing of the candidate shape of the hole positions serving as the circle (arc).

The candidate shape program generation unit 40 first determines whether or not the hole positions $C_S$ in the matching shape information are present on the same circumference C (radius R) (S561). When the hole positions $C_S$ are not present on the same circumference C, the candidate shape program generation unit 40 completes the determination processing of the candidate shape.

When the hole positions $C_S$ are present on the same circumference C, the candidate shape program generation unit 40 increments the number of times of repetition processing i (S562). Here, i is less than the number N of hole positions in the CAD shape information. Then, the candidate shape program generation unit 40 determines a distance D between a hole position Ci and the circular center of the circumference C (S563). Then, the candidate shape program generation unit 40 determines whether or not the distance D is the same as the radius R of the circumference C (S564). When it does not hold true that D=R, the candidate shape program generation unit 40 returns to step S562 so as to repeat processing from step S562 to step S564.

When D=R, the candidate shape program generation unit 40 sets the hole position Ci to the candidate shape (S565), and completes the determination processing of the candidate shape.

(Program Generation of Candidate Shape) (Contour Shape)

Figure 10B:
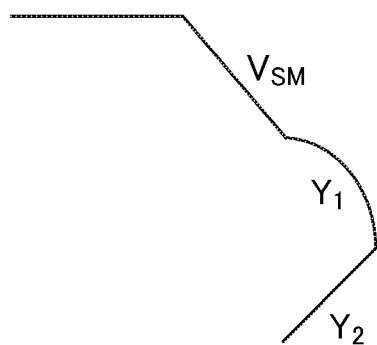
FIG. 10B is a diagram showing an example of the candidate shape which is generated with the matching shape information, the CAD shape information or the candidate shape program generation unit in contouring.
Figure 10C:
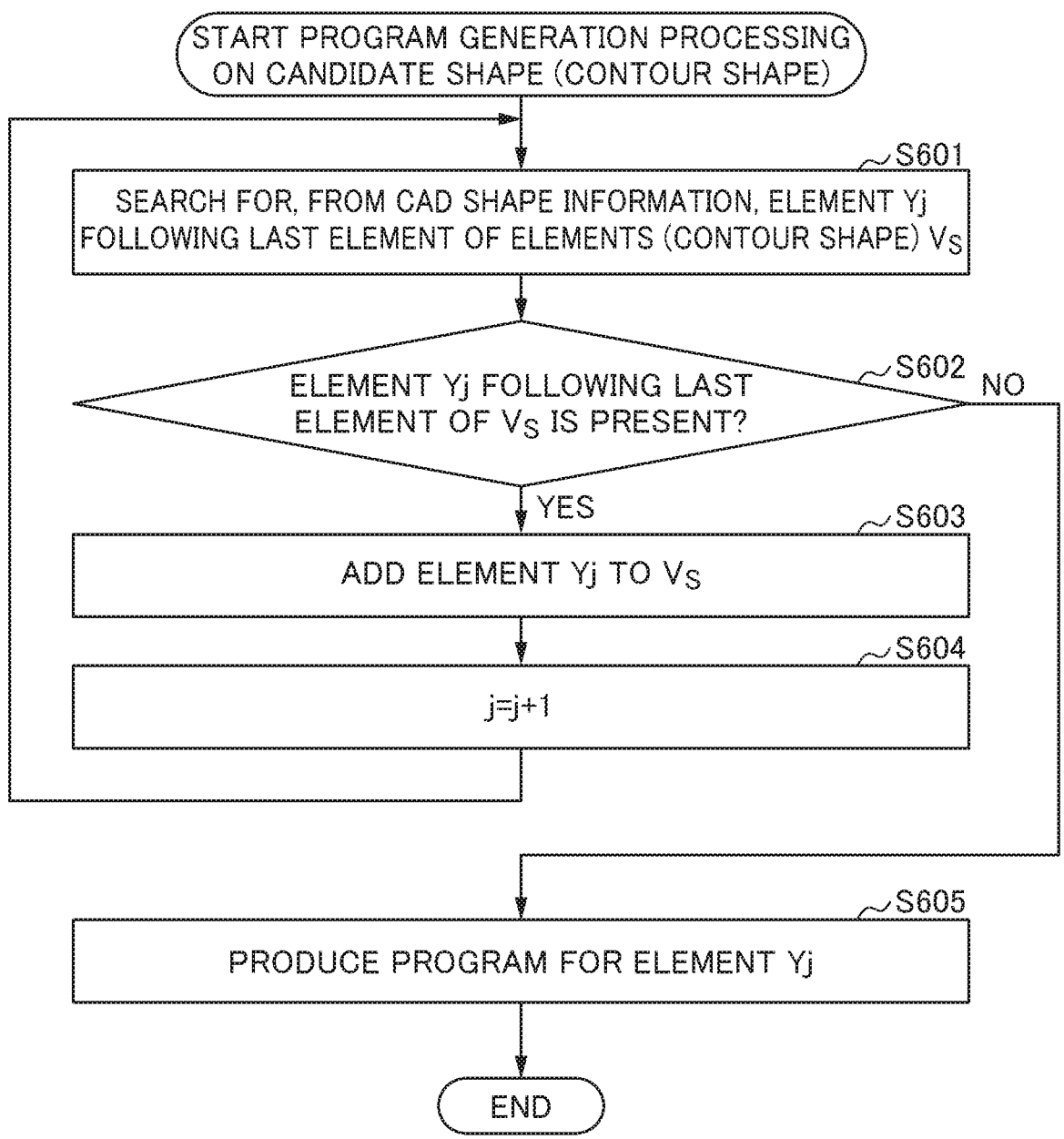
FIG. 10C is a flowchart showing program generation processing (contour shape) on the candidate shape performed with the candidate shape program generation unit.

FIG. 10A is a diagram showing examples of the matching shape information and the CAD shape information in contouring, and FIG. 10B is a diagram showing an example of the candidate shape which is generated with the matching shape information, the CAD shape information or the candidate shape program generation unit in contouring. FIG. 10C is a flowchart showing program generation processing (contour shape) on the candidate shape performed with the candidate shape program generation unit.

The candidate shape program generation unit 40 first searches for an element Yj which is connected to the last element of elements (contour shape) $V_S$ in the matching shape information from the CAD shape information (S601) so as to determine whether or not the element Yj following the last element of the elements (contour shape) $V_S$ is present (S602).

When the element Yj is present, the candidate shape program generation unit 40 adds the element Yj to the elements (contour shape) $V_S$ (S603). Then, the candidate shape program generation unit 40 increments 1 (S604), and repeats processing from step S601 to S604 until the element Yj following the last element of the elements (contour shape) $V_S$ is not present in step S602.

When the element Yj following the last element of the elements (contour shape) $V_S$ is not present in step S602, the candidate shape program generation unit 40 sets all the elements Yj to the candidate shape (contour shape), automatically generates a program for the candidate shape (contour shape) (S605) and completes the program generation.

FIG. 11A is a diagram showing an example of a display which is produced with the CAD data display unit (right side) and the program display unit (left side) in the display unit (drilling).

The CAD data display unit 52 (right side) in the display unit 50 displays the CAD data. In this way, the operator manually generates the NC program while seeing the CAD drawing. The CAD data display unit 52 displays the hole positions $C_S$ in the matching shape information on which the shape matching has been performed with the shape matching unit 30 (or hole positions PM in the machining shape information which is obtained with the NC program analysis unit 12 and which is in the middle of being produced) and the candidate shape which is predicted with the candidate shape program generation unit 40 so as to superimpose them on the CAD data.

The program display unit 54 (left side) in the display unit 50 displays the NC program which is in the middle of being produced by the operator, and displays the NC program for the candidate shape which is generated with the candidate shape program generation unit 40.

FIG. 11B is a diagram showing an example of a display which is produced with the CAD data display unit (right side) and the program display unit (left side) in the display unit (contouring).

The CAD data display unit 52 (right side) in the display unit 50 displays the CAD data. In this way, the operator manually generates the NC program while seeing the CAD drawing. The CAD data display unit 52 displays the elements (contour shape) $V_S$ in the matching shape information on which the shape matching has been performed with the shape matching unit 30 (or elements (contour shape) VP in the machining shape information which is obtained with the NC program analysis unit 12 and which is in the middle of being produced) and the candidate shape which is predicted with the candidate shape program generation unit 40 so as to superimpose them on the CAD data.

The program display unit 54 (left side) in the display unit 50 displays the NC program which is in the middle of being produced by the operator, and displays the NC program for the candidate shape which is generated with the candidate shape program generation unit 40.

As described above, in the machining program generation support device 1 of the present embodiment, the NC program which is in the middle of being produced by the operator is compared with the CAD data (shape matching), and thus the program for the candidate shape following the NC program which is in the middle of being produced is predicted and displayed. In this way, the operator can complete the NC program only by checking and determining the program for the candidate shape. As described above, when the operator manually generates the machining program, it is possible to support the generation of the machining program, with the result that it is possible to reduce time and effort in input and an input error made by the operator.

Although the embodiment of the present invention has been described, the present invention is not limited to the embodiment described above, and various modifications and variations are possible. For example, in the embodiment described above, the machining program generation support device is illustrated which supports the generation of the NC program of the numerical controller for controlling the machine tool. However, the machining program generation support device of the present embodiment is not limited to this illustration, and can be applied to various machining program generation support devices which support the generation of machining programs of various industrial machines.

EXPLANATION OF REFERENCE NUMERALS 1 machining program generation support device
11 NC program input unit
12 NC program analysis unit (machining program analysis unit.)
13 NC shape information storage unit
21 CAD data input unit
22 CAD data analysis unit
23 CAD shape information storage unit
25 coordinate system setting unit
30 shape matching unit
40 candidate shape program generation unit
50 display unit
52 CAD data display unit 52
54 program display unit

What is claimed is:

1. A machining program generation support device which supports generation of a machining program for a workpiece from CAD data of the workpiece, the machining program generation support device comprising:
   a CAD data analysis unit which analyzes the CAD data so as to obtain CAD shape information serving as shape information of the workpiece;
   a machining program analysis unit which analyzes the machining program that is in a middle of being produced by an operator so as to obtain machining shape information serving as the shape information of the workpiece that is in a middle of being produced;
   a shape matching unit which performs matching of shapes of the CAD shape information obtained with the CAD data analysis unit and the machining shape information that is obtained with the machining program analysis unit and that is in the middle of being produced so as to obtain matching shape information on which shape matching has been performed;
   a candidate shape program generation unit that predicts, based on the CAD shape information obtained with the CAD data analysis unit, a candidate shape following the matching shape information on which the shape matching has been performed with the shape matching unit, and that thereby predicts a candidate shape following the machining shape information which is in the middle of being produced so as to automatically generate a machining program for the candidate shape following the machining program which is in the middle of being produced; and
   a display unit which displays the machining program that is in the middle of being produced by the operator and which displays the machining program for the candidate shape that is generated with the candidate shape program generation unit.

2. The machining program generation support device according to claim 1, wherein the display unit further displays the matching shape information on which the shape matching has been performed with the shape matching unit and the candidate shape which is predicted with the candidate shape program generation unit so as to superimpose the matching shape information and the candidate shape on the CAD data.

3. The machining program generation support, device according to claim 1, wherein the display unit further displays the machining shape information which is obtained with the machining program analysis unit and which is in the middle of being produced and the candidate shape which is predicted with the candidate shape program generation unit so as to superimpose the machining shape information and the candidate shape on the CAD data.

4. The machining program generation support device according to claim 1, wherein in drilling, the CAD shape information and the machining shape information include coordinates of a center point of a hole position whereas, in contouring, the CAD shape information and the machining shape information. include at least one of:
   coordinates of a start point of a straight line and coordinates of an end point thereof;
   coordinates of a center point of a circle and a radius thereof; and
   coordinates of a center point of an arc, and a radius, a start point angle and an end point angle thereof.

5. The machining program generation support device according to claim 4, wherein, in the drilling, the candidate shape program generation unit
   first predicts the candidate shape of the hole positions which are arranged in a lattice shape,
   then predicts the candidate shape of the hole positions which are arranged in a linear shape,
   then predicts the candidate shape or the hole positions which are arranged in a circular shape or an arc shape and
   then predicts the candidate shape of the hole positions which are arranged in a quadrangle shape.

* * * * *